(12) United States Patent
Yin et al.

(10) Patent No.: US 9,308,524 B2
(45) Date of Patent: Apr. 12, 2016

(54) ADVANCED CATALYSTS FOR AUTOMOTIVE APPLICATIONS

(71) Applicant: SDCmaterials, Inc., Tempe, AZ (US)

(72) Inventors: Qinghua Yin, Tempe, AZ (US); Xiwang Qi, Scottsdale, AZ (US); Maximilian A. Biberger, Scottsdale, AZ (US)

(73) Assignee: SDCmaterials, Inc., Tempe, AZ (US)

( * ) Notice: Subject to any disclaimer, the term of this patent is extended or adjusted under 35 U.S.C. 154(b) by 0 days.

(21) Appl. No.: 14/485,545

(22) Filed: Sep. 12, 2014

(65) Prior Publication Data

US 2015/0141236 A1  May 21, 2015

Related U.S. Application Data

(62) Division of application No. 12/962,490, filed on Dec. 7, 2010, now Pat. No. 9,126,191.

(60) Provisional application No. 61/284,329, filed on Dec. 15, 2009.

(51) Int. Cl.
   *B01J 23/00* (2006.01)
   *B01J 23/02* (2006.01)
   (Continued)

(52) U.S. Cl.
   CPC ............. *B01J 23/8926* (2013.01); *B01J 21/04* (2013.01); *B01J 23/42* (2013.01); *B01J 23/464* (2013.01);
   (Continued)

(58) Field of Classification Search
   CPC ............ B01J 23/00; B01J 23/40; B01J 23/42; B01J 23/44; B01J 23/464; B01J 23/56; B01J 21/04; B01J 37/34

USPC ......... 502/261–263, 327, 332–334, 339, 355, 502/415, 439, 527.12, 527.13; 977/773, 977/775
See application file for complete search history.

(56) References Cited

U.S. PATENT DOCUMENTS 2,021,936 A  11/1935  Johnstone
2,284,554 A   5/1942  Beyerstedt
(Continued)

FOREIGN PATENT DOCUMENTS

CN  1647858 A   8/2005
CN  101011664 A  8/2007
(Continued)

OTHER PUBLICATIONS

Ahmad, K. et al. (2008). "Hybrid Nanocomposites: A New Route Towards Tougher Alumina Ceramics," *Composites Science and Technology* 68: 1321-1327.
(Continued)

*Primary Examiner* — Cam N. Nguyen
(74) *Attorney, Agent, or Firm* — Morrison & Foerster LLP

(57) ABSTRACT

Embodiments of present inventions are directed to an advanced catalyst. The advanced catalyst includes a honeycomb structure with an at least one nano-particle on the honeycomb structure. The advanced catalyst used in diesel engines is a two-way catalyst. The advanced catalyst used in gas engines is a three-way catalyst. In both the two-way catalyst and the three-way catalyst, the at least one nano-particle includes nano-active material and nano-support. The nano-support is typically alumina. In the two-way catalyst, the nano-active material is platinum. In the three-way catalyst, the nano-active material is platinum, palladium, rhodium, or an alloy. The alloy is of platinum, palladium, and rhodium.

34 Claims, 10 Drawing Sheets

(51) Int. Cl.
  *B01J 23/08* (2006.01)
  *B01J 23/40* (2006.01)
  *B01J 23/42* (2006.01)
  *B01J 23/44* (2006.01)
  *B01J 23/56* (2006.01)
  *B01J 21/00* (2006.01)
  *B01J 21/04* (2006.01)
  *B01J 23/89* (2006.01)
  *B01J 35/00* (2006.01)
  *B01J 37/00* (2006.01)
  *B01J 37/32* (2006.01)
  *B01J 37/34* (2006.01)
  *B28B 23/00* (2006.01)
  *B32B 7/12* (2006.01)
  *B32B 37/14* (2006.01)
  *B82Y 30/00* (2011.01)
  *B82Y 40/00* (2011.01)
  *C23C 4/12* (2006.01)
  *B01J 37/02* (2006.01)
  *B01J 23/46* (2006.01)

(52) U.S. Cl.
  CPC .............. *B01J 35/0013* (2013.01); *B01J 37/00* (2013.01); *B01J 37/009* (2013.01); *B01J 37/0211* (2013.01); *B01J 37/32* (2013.01); *B01J 37/349* (2013.01); *B28B 23/0087* (2013.01); *B32B 7/12* (2013.01); *B32B 37/14* (2013.01); *B82Y 30/00* (2013.01); *B82Y 40/00* (2013.01); *C23C 4/127* (2013.01); *Y02T 10/22* (2013.01)

(56) References Cited

U.S. PATENT DOCUMENTS

| | | |
|---|---|---|
| 2,419,042 A | 4/1947 | Todd |
| 2,519,531 A | 8/1950 | Worn |
| 2,562,753 A | 7/1951 | Trost |
| 2,689,780 A | 9/1954 | Rice |
| 3,001,402 A | 9/1961 | Koblin |
| 3,042,511 A | 7/1962 | Reding, Jr. |
| 3,067,025 A | 12/1962 | Chisholm |
| 3,145,287 A | 8/1964 | Siebein et al. |
| 3,178,121 A | 4/1965 | Wallace, Jr. |
| 3,179,782 A | 4/1965 | Matvay |
| 3,181,947 A | 5/1965 | Vordahl |
| 3,235,700 A | 2/1966 | Mondain-Monval et al. |
| 3,313,908 A | 4/1967 | Unger et al. |
| 3,387,110 A | 6/1968 | Wendler et al. |
| 3,401,465 A | 9/1968 | Larwill |
| 3,450,926 A | 6/1969 | Kiernan |
| 3,457,788 A | 7/1969 | Nobuo Miyajima |
| 3,520,656 A | 7/1970 | Yates et al. |
| 3,537,513 A | 11/1970 | Austin |
| 3,552,653 A | 1/1971 | Inoue |
| 3,617,358 A | 11/1971 | Dittrich |
| 3,667,111 A | 6/1972 | Chartet |
| 3,730,827 A | 5/1973 | Matchen et al. |
| 3,741,001 A | 6/1973 | Fletcher et al. |
| 3,743,708 A * | 7/1973 | Chase et al. ............ B82Y 30/00 423/617 |
| 3,752,172 A | 8/1973 | Cohen et al. |
| 3,761,360 A | 9/1973 | Auvil et al. |
| 3,774,442 A | 11/1973 | Gustavsson |
| 3,804,034 A | 4/1974 | Stiglich, Jr. |
| 3,830,756 A | 8/1974 | Sanchez et al. |
| 3,857,744 A | 12/1974 | Moss |
| 3,871,448 A | 3/1975 | Vann et al. |
| 3,892,882 A | 7/1975 | Guest et al. |
| 3,914,573 A | 10/1975 | Muehlberger |
| 3,959,094 A | 5/1976 | Steinberg |
| 3,959,420 A | 5/1976 | Geddes et al. |
| 3,969,482 A | 7/1976 | Teller |
| 4,008,620 A | 2/1977 | Narato et al. |
| 4,018,388 A | 4/1977 | Andrews |
| 4,021,021 A | 5/1977 | Hall et al. |
| 4,127,760 A | 11/1978 | Meyer et al. |
| 4,139,497 A | 2/1979 | Castor et al. |
| 4,146,654 A | 3/1979 | Guyonnet |
| 4,157,316 A | 6/1979 | Thompson et al. |
| 4,171,288 A | 10/1979 | Keith et al. |
| 4,174,298 A | 11/1979 | Antos |
| 4,189,925 A | 2/1980 | Long |
| 4,227,928 A | 10/1980 | Wang |
| 4,248,387 A | 2/1981 | Andrews |
| 4,253,917 A | 3/1981 | Wang |
| 4,260,649 A | 4/1981 | Dension et al. |
| 4,284,609 A | 8/1981 | deVries |
| 4,315,874 A | 2/1982 | Ushida et al. |
| 4,326,492 A | 4/1982 | Leibrand, Sr. et al. |
| 4,344,779 A | 8/1982 | Isserlis |
| 4,369,167 A | 1/1983 | Weir |
| 4,388,274 A | 6/1983 | Rourke et al. |
| 4,419,331 A | 12/1983 | Montalvo |
| 4,431,750 A | 2/1984 | McGinnis et al. |
| 4,436,075 A | 3/1984 | Campbell et al. |
| 4,440,733 A | 4/1984 | Lawson et al. |
| 4,458,138 A | 7/1984 | Adrian et al. |
| 4,459,327 A | 7/1984 | Wang |
| 4,505,945 A | 3/1985 | Dubust et al. |
| 4,506,136 A | 3/1985 | Smyth et al. |
| 4,513,149 A | 4/1985 | Gray et al. |
| 4,523,981 A | 6/1985 | Ang et al. |
| 4,545,872 A | 10/1985 | Sammells et al. |
| RE32,244 E | 9/1986 | Andersen |
| 4,609,441 A | 9/1986 | Frese, Jr. et al. |
| 4,610,857 A | 9/1986 | Ogawa et al. |
| 4,616,779 A | 10/1986 | Serrano et al. |
| 4,642,207 A | 2/1987 | Uda et al. |
| 4,723,589 A | 2/1988 | Iyer et al. |
| 4,731,517 A | 3/1988 | Cheney |
| 4,751,021 A | 6/1988 | Mollon et al. |
| 4,764,283 A | 8/1988 | Ashbrook et al. |
| 4,765,805 A | 8/1988 | Wahl et al. |
| 4,780,591 A | 10/1988 | Bernecki et al. |
| 4,824,624 A | 4/1989 | Palicka et al. |
| 4,836,084 A | 6/1989 | Vogelesang et al. |
| 4,855,505 A | 8/1989 | Koll |
| 4,866,240 A | 9/1989 | Webber |
| 4,877,937 A | 10/1989 | Müller |
| 4,885,038 A | 12/1989 | Anderson et al. |
| 4,921,586 A | 5/1990 | Molter |
| 4,970,364 A | 11/1990 | Müller |
| 4,982,050 A | 1/1991 | Gammie et al. |
| 4,983,555 A | 1/1991 | Roy et al. |
| 4,987,033 A | 1/1991 | Abkowitz et al. |
| 5,006,163 A | 4/1991 | Benn et al. |
| 5,015,863 A | 5/1991 | Takeshima et al. |
| 5,041,713 A | 8/1991 | Weidman |
| 5,043,548 A | 8/1991 | Whitney et al. |
| 5,070,064 A | 12/1991 | Hsu et al. |
| 5,073,193 A | 12/1991 | Chaklader et al. |
| 5,133,190 A | 7/1992 | Abdelmalek |
| 5,151,296 A | 9/1992 | Tokunaga |
| 5,157,007 A | 10/1992 | Domesle et al. |
| 5,187,140 A | 2/1993 | Thorsteinson et al. |
| 5,192,130 A | 3/1993 | Endo et al. |
| 5,217,746 A | 6/1993 | Lenling et al. |
| 5,225,656 A | 7/1993 | Frind |
| 5,230,844 A | 7/1993 | Macaire et al. |
| 5,233,153 A | 8/1993 | Coats |
| 5,269,848 A | 12/1993 | Nakagawa |
| 5,294,242 A | 3/1994 | Zurecki et al. |
| 5,330,945 A | 7/1994 | Beckmeyer et al. |
| 5,338,716 A | 8/1994 | Triplett et al. |
| 5,357,075 A | 10/1994 | Muehlberger |
| 5,369,241 A | 11/1994 | Taylor et al. |
| 5,371,049 A | 12/1994 | Moffett et al. |
| 5,372,629 A | 12/1994 | Anderson et al. |
| 5,392,797 A | 2/1995 | Welch |
| 5,436,080 A | 7/1995 | Inoue et al. |

(56) References Cited

U.S. PATENT DOCUMENTS

| | | | |
|---|---|---|---|
| 5,439,865 A | 8/1995 | Abe et al. |
| 5,442,153 A | 8/1995 | Marantz et al. |
| 5,452,854 A | 9/1995 | Keller |
| 5,460,701 A | 10/1995 | Parker et al. |
| 5,464,458 A | 11/1995 | Yamamoto |
| 5,485,941 A | 1/1996 | Guyomard et al. |
| 5,486,675 A | 1/1996 | Taylor et al. |
| 5,489,449 A | 2/1996 | Umeya et al. |
| 5,510,086 A | 4/1996 | Hemingway et al. |
| 5,534,149 A | 7/1996 | Birkenbeil et al. |
| 5,534,270 A | 7/1996 | De Castro |
| 5,543,173 A | 8/1996 | Horn, Jr. et al. |
| 5,553,507 A | 9/1996 | Basch et al. |
| 5,558,771 A | 9/1996 | Hagen et al. |
| 5,562,966 A | 10/1996 | Clarke et al. |
| 5,582,807 A | 12/1996 | Liao et al. |
| 5,596,973 A | 1/1997 | Grice |
| 5,611,896 A | 3/1997 | Swanepoel et al. |
| 5,630,322 A | 5/1997 | Heilmann et al. |
| 5,652,304 A | 7/1997 | Calderon et al. |
| 5,714,644 A | 2/1998 | Irgang et al. |
| 5,723,027 A | 3/1998 | Serole |
| 5,723,187 A | 3/1998 | Popoola et al. |
| 5,726,414 A | 3/1998 | Kitahashi et al. |
| 5,733,662 A | 3/1998 | Bogachek |
| 5,749,938 A | 5/1998 | Coombs |
| 5,776,359 A | 7/1998 | Schultz et al. |
| 5,788,738 A | 8/1998 | Pirzada et al. |
| 5,804,155 A | 9/1998 | Farrauto et al. |
| 5,811,187 A | 9/1998 | Anderson et al. |
| 5,837,959 A | 11/1998 | Muehlberger et al. |
| 5,851,507 A | 12/1998 | Pirzada et al. |
| 5,853,815 A | 12/1998 | Muehlberger |
| 5,858,470 A | 1/1999 | Bernecki et al. |
| 5,884,473 A | 3/1999 | Noda et al. |
| 5,905,000 A | 5/1999 | Yadav et al. |
| 5,928,806 A | 7/1999 | Olah et al. |
| 5,935,293 A | 8/1999 | Detering et al. |
| 5,973,289 A | 10/1999 | Read et al. |
| 5,989,648 A | 11/1999 | Phillips |
| 5,993,967 A | 11/1999 | Brotzman, Jr. et al. |
| 5,993,988 A | 11/1999 | Ohara et al. |
| 6,004,620 A | 12/1999 | Camm |
| 6,012,647 A | 1/2000 | Ruta et al. |
| 6,033,781 A | 3/2000 | Brotzman, Jr. et al. |
| 6,045,765 A | 4/2000 | Nakatsuji et al. |
| 6,059,853 A | 5/2000 | Coombs |
| 6,066,587 A | 5/2000 | Kurokawa et al. |
| 6,084,197 A | 7/2000 | Fusaro, Jr. |
| 6,093,306 A | 7/2000 | Hanrahan et al. |
| 6,093,378 A | 7/2000 | Deeba et al. |
| 6,102,106 A | 8/2000 | Manning et al. |
| 6,117,376 A | 9/2000 | Merkel |
| 6,139,813 A | 10/2000 | Narula et al. |
| 6,140,539 A | 10/2000 | Sander et al. |
| 6,168,694 B1 | 1/2001 | Huang et al. |
| 6,190,627 B1 | 2/2001 | Hoke et al. |
| 6,213,049 B1 | 4/2001 | Yang |
| 6,214,195 B1 | 4/2001 | Yadav et al. |
| 6,228,904 B1 | 5/2001 | Yadav et al. |
| 6,231,792 B1 | 5/2001 | Overbeek et al. |
| 6,254,940 B1 | 7/2001 | Pratsinis et al. |
| 6,261,484 B1 | 7/2001 | Phillips et al. |
| 6,267,864 B1 | 7/2001 | Yadav et al. |
| 6,322,756 B1 | 11/2001 | Arno et al. |
| 6,342,465 B1 | 1/2002 | Klein et al. |
| 6,344,271 B1 | 2/2002 | Yadav et al. |
| 6,362,449 B1 | 3/2002 | Hadidi et al. |
| 6,379,419 B1 | 4/2002 | Celik et al. |
| 6,387,560 B1 | 5/2002 | Yadav et al. |
| 6,395,214 B1 | 5/2002 | Kear et al. |
| 6,398,843 B1 | 6/2002 | Tarrant |
| 6,399,030 B1 | 6/2002 | Nolan |
| 6,409,851 B1 | 6/2002 | Sethuram et al. |
| 6,413,781 B1 | 7/2002 | Geis et al. |
| 6,413,898 B1 | 7/2002 | Faber et al. |
| 6,416,818 B1 | 7/2002 | Aikens et al. |
| RE37,853 E | 9/2002 | Detering et al. |
| 6,444,009 B1 | 9/2002 | Liu et al. |
| 6,475,951 B1 | 11/2002 | Domesle et al. |
| 6,488,904 B1 | 12/2002 | Cox et al. |
| 6,491,423 B1 | 12/2002 | Skibo et al. |
| 6,506,995 B1 | 1/2003 | Fusaro, Jr. et al. |
| 6,517,800 B1 | 2/2003 | Cheng et al. |
| 6,524,662 B2 | 2/2003 | Jang et al. |
| 6,531,704 B2 | 3/2003 | Yadav et al. |
| 6,548,445 B1 | 4/2003 | Buysch et al. |
| 6,554,609 B2 | 4/2003 | Yadav et al. |
| 6,562,304 B1 | 5/2003 | Mizrahi |
| 6,562,495 B2 | 5/2003 | Yadav et al. |
| 6,569,393 B1 | 5/2003 | Hoke et al. |
| 6,569,397 B1 | 5/2003 | Yadav et al. |
| 6,569,518 B2 | 5/2003 | Yadav et al. |
| 6,572,672 B2 | 6/2003 | Yadav et al. |
| 6,579,446 B1 | 6/2003 | Teran et al. |
| 6,596,187 B2 | 7/2003 | Coll et al. |
| 6,603,038 B1 | 8/2003 | Hagemeyer et al. |
| 6,607,821 B2 | 8/2003 | Yadav et al. |
| 6,610,355 B2 | 8/2003 | Yadav et al. |
| 6,623,559 B2 | 9/2003 | Huang |
| 6,635,357 B2 | 10/2003 | Moxson et al. |
| 6,641,775 B2 | 11/2003 | Vigliotti et al. |
| 6,652,822 B2 | 11/2003 | Phillips et al. |
| 6,652,967 B2 | 11/2003 | Yadav et al. |
| 6,669,823 B1 | 12/2003 | Sarkas et al. |
| 6,682,002 B2 | 1/2004 | Kyotani |
| 6,689,192 B1 | 2/2004 | Phillips et al. |
| 6,699,398 B1 | 3/2004 | Kim |
| 6,706,097 B2 | 3/2004 | Zomes |
| 6,706,660 B2 | 3/2004 | Park |
| 6,710,207 B2 | 3/2004 | Bogan, Jr. et al. |
| 6,713,176 B2 | 3/2004 | Yadav et al. |
| 6,716,525 B1 | 4/2004 | Yadav et al. |
| 6,744,006 B2 | 6/2004 | Johnson et al. |
| 6,746,791 B2 | 6/2004 | Yadav et al. |
| 6,772,584 B2 | 8/2004 | Chun et al. |
| 6,780,350 B1 * | 8/2004 | Kodas .................. B01J 2/02 257/E21.304 |
| 6,786,950 B2 | 9/2004 | Yadav et al. |
| 6,813,931 B2 | 11/2004 | Yadav et al. |
| 6,817,388 B2 | 11/2004 | Tsangaris et al. |
| 6,832,735 B2 | 12/2004 | Yadav et al. |
| 6,838,072 B1 | 1/2005 | Kong et al. |
| 6,841,509 B1 | 1/2005 | Hwang et al. |
| 6,855,410 B2 | 2/2005 | Buckley |
| 6,855,426 B2 | 2/2005 | Yadav |
| 6,855,749 B1 | 2/2005 | Yadav et al. |
| 6,858,170 B2 | 2/2005 | Van Thillo et al. |
| 6,886,545 B1 | 5/2005 | Holm |
| 6,891,319 B2 | 5/2005 | Dean et al. |
| 6,896,958 B1 | 5/2005 | Cayton et al. |
| 6,902,699 B2 | 6/2005 | Fritzemeier et al. |
| 6,916,872 B2 | 7/2005 | Yadav et al. |
| 6,919,065 B2 | 7/2005 | Zhou et al. |
| 6,919,527 B2 | 7/2005 | Boulos et al. |
| 6,933,331 B2 | 8/2005 | Yadav et al. |
| 6,972,115 B1 | 12/2005 | Ballard |
| 6,986,877 B2 | 1/2006 | Takikawa et al. |
| 6,994,837 B2 | 2/2006 | Boulos et al. |
| 7,007,872 B2 | 3/2006 | Yadav et al. |
| 7,022,305 B2 | 4/2006 | Drumm et al. |
| 7,052,777 B2 | 5/2006 | Brotzman, Jr. et al. |
| 7,066,976 B2 * | 6/2006 | Hampden-Smith ........ B01J 2/02 257/E23.075 |
| 7,073,559 B2 | 7/2006 | O'Larey et al. |
| 7,074,364 B2 | 7/2006 | Jähn et al. |
| 7,081,267 B2 | 7/2006 | Yadav |
| 7,094,370 B2 * | 8/2006 | Kodas .................. B01J 2/02 257/E23.075 |
| 7,101,819 B2 | 9/2006 | Rosenflanz et al. |
| 7,147,544 B2 | 12/2006 | Rosenflanz |
| 7,147,894 B2 | 12/2006 | Zhou et al. |
| 7,166,198 B2 | 1/2007 | Van Der Walt et al. |
| 7,166,663 B2 | 1/2007 | Cayton et al. |

(56) References Cited

U.S. PATENT DOCUMENTS

| | | |
|---|---|---|
| 7,172,649 B2 | 2/2007 | Conrad et al. |
| 7,172,790 B2 | 2/2007 | Koulik et al. |
| 7,178,747 B2 | 2/2007 | Yadav et al. |
| 7,208,126 B2 | 4/2007 | Musick et al. |
| 7,211,236 B2 | 5/2007 | Stark et al. |
| 7,217,407 B2 | 5/2007 | Zhang |
| 7,220,398 B2 | 5/2007 | Sutorik et al. |
| 7,255,498 B2 | 8/2007 | Bush et al. |
| 7,265,076 B2 | 9/2007 | Taguchi et al. |
| 7,282,167 B2 | 10/2007 | Carpenter |
| 7,307,195 B2 | 12/2007 | Polverejan et al. |
| 7,323,655 B2 | 1/2008 | Kim |
| 7,384,447 B2 | 6/2008 | Kodas et al. |
| 7,402,899 B1 | 7/2008 | Whiting et al. |
| 7,417,008 B2 | 8/2008 | Richards et al. |
| 7,494,527 B2 | 2/2009 | Jurewicz et al. |
| 7,507,495 B2 | 3/2009 | Wang et al. |
| 7,517,826 B2 | 4/2009 | Fujdala et al. |
| 7,534,738 B2 | 5/2009 | Fujdala et al. |
| 7,541,012 B2 | 6/2009 | Yeung et al. |
| 7,541,310 B2 | 6/2009 | Espinoza et al. |
| 7,557,324 B2 | 7/2009 | Nylen et al. |
| 7,572,315 B2 | 8/2009 | Boulos et al. |
| 7,576,029 B2 | 8/2009 | Saito et al. |
| 7,576,031 B2 | 8/2009 | Beutel et al. |
| 7,601,294 B2 | 10/2009 | Ripley et al. |
| 7,604,843 B1 | 10/2009 | Robinson et al. |
| 7,611,686 B2 | 11/2009 | Alekseeva et al. |
| 7,615,097 B2 | 11/2009 | McKeclutie et al. |
| 7,618,919 B2 | 11/2009 | Shimazu et al. |
| 7,622,693 B2 | 11/2009 | Foret |
| 7,632,775 B2 | 12/2009 | Zhou et al. |
| 7,635,218 B1 | 12/2009 | Lott |
| 7,674,744 B2 | 3/2010 | Shiratori et al. |
| 7,678,419 B2 | 3/2010 | Kevwitch et al. |
| 7,704,369 B2 | 4/2010 | Olah et al. |
| 7,709,411 B2 | 5/2010 | Zhou et al. |
| 7,709,414 B2 | 5/2010 | Fujdala et al. |
| 7,745,367 B2 | 6/2010 | Fujdala et al. |
| 7,750,265 B2 | 7/2010 | Belashchenko et al. |
| 7,759,279 B2 | 7/2010 | Shiratori et al. |
| 7,759,281 B2 | 7/2010 | Kezuka et al. |
| 7,803,210 B2 | 9/2010 | Sekine et al. |
| 7,842,515 B2 | 11/2010 | Zou et al. |
| 7,851,405 B2 | 12/2010 | Wakamatsu et al. |
| 7,874,239 B2 | 1/2011 | Howland |
| 7,875,573 B2 | 1/2011 | Beutel et al. |
| 7,897,127 B2 | 3/2011 | Layman et al. |
| 7,902,104 B2 | 3/2011 | Kalck |
| 7,905,942 B1 | 3/2011 | Layman |
| 7,935,655 B2 | 5/2011 | Tolmachev |
| 7,951,428 B2 | 5/2011 | Hoerr et al. |
| 8,003,020 B2 | 8/2011 | Jankowiak et al. |
| 8,051,724 B1 | 11/2011 | Layman et al. |
| 8,076,258 B1 | 12/2011 | Biberger |
| 8,080,494 B2 | 12/2011 | Yasuda et al. |
| 8,089,495 B2 | 1/2012 | Keller |
| 8,129,654 B2 | 3/2012 | Lee et al. |
| 8,142,619 B2 | 3/2012 | Layman et al. |
| 8,168,561 B2 | 5/2012 | Virkar |
| 8,173,572 B2 | 5/2012 | Feaviour |
| 8,211,392 B2 | 7/2012 | Grubert et al. |
| 8,258,070 B2 | 9/2012 | Fujdala et al. |
| 8,278,240 B2 | 10/2012 | Tange et al. |
| 8,294,060 B2 | 10/2012 | Mohanty et al. |
| 8,309,489 B2 | 11/2012 | Roldan Cuenya et al. |
| 8,349,761 B2 | 1/2013 | Xia et al. |
| 8,404,611 B2 | 3/2013 | Nakamura et al. |
| 8,470,112 B1 | 6/2013 | Biberger |
| 8,481,449 B1 | 7/2013 | Biberger et al. |
| 8,507,401 B1 | 8/2013 | Biberger et al. |
| 8,507,402 B1 | 8/2013 | Biberger et al. |
| 8,524,631 B2 | 9/2013 | Biberger |
| 8,545,652 B1 | 10/2013 | Biberger |
| 8,557,727 B2 | 10/2013 | Yin et al. |
| 8,574,408 B2 | 11/2013 | Layman |
| 8,574,520 B2 | 11/2013 | Koplin et al. |
| 8,575,059 B1 | 11/2013 | Biberger et al. |
| 8,604,398 B1 | 12/2013 | Layman |
| 8,652,992 B2 | 2/2014 | Yin et al. |
| 8,668,803 B1 | 3/2014 | Biberger |
| 8,669,202 B2 | 3/2014 | van den Hoek et al. |
| 8,679,433 B2 | 3/2014 | Yin et al. |
| 8,821,786 B1 | 9/2014 | Biberger |
| 8,828,328 B1 | 9/2014 | Leamon et al. |
| 8,859,035 B1 | 10/2014 | Leamon |
| 8,877,357 B1 | 11/2014 | Biberger |
| 8,893,651 B1 | 11/2014 | Biberger et al. |
| 8,906,498 B1 | 12/2014 | Biberger |
| 8,927,403 B2 * | 1/2015 | Huotari ............ H01L 21/28079 |
| | | 438/584 |
| 8,932,514 B1 | 1/2015 | Yin et al. |
| 8,992,820 B1 | 3/2015 | Yin et al. |
| 9,023,754 B2 | 5/2015 | Biberger |
| 9,039,916 B1 | 5/2015 | Lehman, Jr. |
| 9,089,840 B2 | 7/2015 | Biberger et al. |
| 9,090,475 B1 | 7/2015 | Lehman, Jr. |
| 9,119,309 B1 | 8/2015 | Lehman, Jr. |
| 9,126,191 B2 | 9/2015 | Yin et al. |
| 9,132,404 B2 | 9/2015 | Layman |
| 9,149,797 B2 | 10/2015 | Leamon |
| 9,156,025 B2 | 10/2015 | Qi et al. |
| 9,180,423 B2 | 11/2015 | Biberger et al. |
| 2001/0004009 A1 | 6/2001 | MacKelvie |
| 2001/0042802 A1 | 11/2001 | Youds |
| 2001/0055554 A1 | 12/2001 | Hoke et al. |
| 2002/0018815 A1 | 2/2002 | Sievers et al. |
| 2002/0068026 A1 | 6/2002 | Murrell et al. |
| 2002/0071800 A1 | 6/2002 | Hoke et al. |
| 2002/0079620 A1 | 6/2002 | DuBuis et al. |
| 2002/0100751 A1 | 8/2002 | Carr |
| 2002/0102674 A1 | 8/2002 | Anderson |
| 2002/0131914 A1 | 9/2002 | Sung |
| 2002/0143417 A1 | 10/2002 | Ito et al. |
| 2002/0168466 A1 | 11/2002 | Tapphorn et al. |
| 2002/0182735 A1 | 12/2002 | Kibby et al. |
| 2002/0183191 A1 | 12/2002 | Faber et al. |
| 2002/0192129 A1 | 12/2002 | Shamouilian et al. |
| 2003/0036786 A1 | 2/2003 | Duren et al. |
| 2003/0042232 A1 | 3/2003 | Shimazu |
| 2003/0047617 A1 | 3/2003 | Shanmugham et al. |
| 2003/0066800 A1 | 4/2003 | Saim et al. |
| 2003/0085663 A1 | 5/2003 | Horsky |
| 2003/0102099 A1 | 6/2003 | Yadav et al. |
| 2003/0108459 A1 | 6/2003 | Wu et al. |
| 2003/0110931 A1 | 6/2003 | Aghajanian et al. |
| 2003/0129098 A1 | 7/2003 | Endo et al. |
| 2003/0139288 A1 | 7/2003 | Cai et al. |
| 2003/0143153 A1 | 7/2003 | Boulos et al. |
| 2003/0172772 A1 | 9/2003 | Sethuram et al. |
| 2003/0223546 A1 | 12/2003 | McGregor et al. |
| 2004/0009118 A1 | 1/2004 | Phillips et al. |
| 2004/0023302 A1 | 2/2004 | Archibald et al. |
| 2004/0023453 A1 | 2/2004 | Xu et al. |
| 2004/0065170 A1 | 4/2004 | Wu et al. |
| 2004/0077494 A1 | 4/2004 | LaBarge et al. |
| 2004/0103751 A1 | 6/2004 | Joseph et al. |
| 2004/0109523 A1 | 6/2004 | Singh et al. |
| 2004/0119064 A1 | 6/2004 | Narayan et al. |
| 2004/0127586 A1 | 7/2004 | Jin et al. |
| 2004/0129222 A1 | 7/2004 | Nylen et al. |
| 2004/0166036 A1 | 8/2004 | Chen et al. |
| 2004/0167009 A1 | 8/2004 | Kuntz et al. |
| 2004/0176246 A1 | 9/2004 | Shirk et al. |
| 2004/0208805 A1 | 10/2004 | Fincke et al. |
| 2004/0213998 A1 | 10/2004 | Hearley et al. |
| 2004/0235657 A1 | 11/2004 | Xiao et al. |
| 2004/0238345 A1 | 12/2004 | Koulik et al. |
| 2004/0251017 A1 | 12/2004 | Pillion et al. |
| 2004/0251241 A1 | 12/2004 | Blutke et al. |
| 2005/0000321 A1 | 1/2005 | O'Larey et al. |
| 2005/0000950 A1 | 1/2005 | Schroder et al. |
| 2005/0058797 A1 | 3/2005 | Sen et al. |
| 2005/0066805 A1 | 3/2005 | Park et al. |

(56) References Cited

U.S. PATENT DOCUMENTS

| | | | |
|---|---|---|---|
| 2005/0070431 A1 | 3/2005 | Alvin et al. |
| 2005/0077034 A1 | 4/2005 | King |
| 2005/0097988 A1 | 5/2005 | Kodas et al. |
| 2005/0106865 A1 | 5/2005 | Chung et al. |
| 2005/0133121 A1 | 6/2005 | Subramanian et al. |
| 2005/0153069 A1 | 7/2005 | Tapphorn et al. |
| 2005/0163673 A1 | 7/2005 | Johnson et al. |
| 2005/0199739 A1 | 9/2005 | Kuroda et al. |
| 2005/0211018 A1 | 9/2005 | Jurewicz et al. |
| 2005/0220695 A1 | 10/2005 | Abatzoglou et al. |
| 2005/0227864 A1 | 10/2005 | Sutorik et al. |
| 2005/0233380 A1 | 10/2005 | Pesiri et al. |
| 2005/0240069 A1 | 10/2005 | Polverejan et al. |
| 2005/0258766 A1 | 11/2005 | Kim |
| 2005/0274646 A1 | 12/2005 | Lawson et al. |
| 2005/0275143 A1 | 12/2005 | Toth |
| 2006/0043651 A1 | 3/2006 | Yamamoto et al. |
| 2006/0051505 A1 | 3/2006 | Kortshagen et al. |
| 2006/0068989 A1 | 3/2006 | Ninomiya et al. |
| 2006/0094595 A1 | 5/2006 | Labarge |
| 2006/0096393 A1 | 5/2006 | Pesiri |
| 2006/0105910 A1 | 5/2006 | Zhou et al. |
| 2006/0108332 A1 | 5/2006 | Belashchenko |
| 2006/0153728 A1 | 7/2006 | Schoenung et al. |
| 2006/0153765 A1 | 7/2006 | Pham-Huu et al. |
| 2006/0159596 A1 | 7/2006 | De La Veaux et al. |
| 2006/0166809 A1 | 7/2006 | Malek et al. |
| 2006/0211569 A1 | 9/2006 | Dang et al. |
| 2006/0213326 A1 | 9/2006 | Gollob et al. |
| 2006/0222780 A1 | 10/2006 | Gurevich et al. |
| 2006/0231525 A1 | 10/2006 | Asakawa et al. |
| 2007/0014919 A1* | 1/2007 | Hamalainen ...... C23C 16/45525 427/248.1 |
| 2007/0020167 A1 | 1/2007 | Han et al. |
| 2007/0044513 A1 | 3/2007 | Kear et al. |
| 2007/0048206 A1 | 3/2007 | Hung et al. |
| 2007/0049484 A1 | 3/2007 | Kear et al. |
| 2007/0063364 A1 | 3/2007 | Hsiao et al. |
| 2007/0084308 A1 | 4/2007 | Nakamura et al. |
| 2007/0084834 A1 | 4/2007 | Hanus et al. |
| 2007/0087934 A1 | 4/2007 | Martens et al. |
| 2007/0092768 A1 | 4/2007 | Lee et al. |
| 2007/0153390 A1 | 7/2007 | Nakamura et al. |
| 2007/0161506 A1 | 7/2007 | Saito et al. |
| 2007/0163385 A1 | 7/2007 | Takahashi et al. |
| 2007/0172721 A1 | 7/2007 | Pak et al. |
| 2007/0173403 A1 | 7/2007 | Koike et al. |
| 2007/0178673 A1 | 8/2007 | Gole et al. |
| 2007/0221404 A1 | 9/2007 | Das et al. |
| 2007/0253874 A1 | 11/2007 | Foret |
| 2007/0259768 A1* | 11/2007 | Kear ...................... C04B 35/117 501/120 |
| 2007/0266825 A1 | 11/2007 | Ripley et al. |
| 2007/0292321 A1 | 12/2007 | Plischke et al. |
| 2008/0006954 A1 | 1/2008 | Yubuta et al. |
| 2008/0026041 A1 | 1/2008 | Tepper et al. |
| 2008/0026932 A1 | 1/2008 | Satoh et al. |
| 2008/0031806 A1 | 2/2008 | Gavenonis et al. |
| 2008/0038578 A1 | 2/2008 | Li |
| 2008/0045405 A1 | 2/2008 | Beutel et al. |
| 2008/0047261 A1 | 2/2008 | Han et al. |
| 2008/0056977 A1 | 3/2008 | Hung et al. |
| 2008/0057212 A1 | 3/2008 | Dorier et al. |
| 2008/0064769 A1 | 3/2008 | Sato et al. |
| 2008/0104735 A1 | 5/2008 | Howland |
| 2008/0105083 A1 | 5/2008 | Nakamura et al. |
| 2008/0108005 A1 | 5/2008 | Carpenter |
| 2008/0116178 A1 | 5/2008 | Weidman |
| 2008/0125308 A1 | 5/2008 | Fujdala et al. |
| 2008/0125313 A1 | 5/2008 | Fujdala et al. |
| 2008/0138651 A1 | 6/2008 | Doi et al. |
| 2008/0175936 A1 | 7/2008 | Tokita et al. |
| 2008/0187714 A1 | 8/2008 | Wakamatsu et al. |
| 2008/0202288 A1 | 8/2008 | McKechnie et al. |
| 2008/0206562 A1 | 8/2008 | Stucky et al. |
| 2008/0207858 A1 | 8/2008 | Kowaleski et al. |
| 2008/0248704 A1 | 10/2008 | Mathis et al. |
| 2008/0274344 A1 | 11/2008 | Vieth et al. |
| 2008/0277092 A1 | 11/2008 | Layman et al. |
| 2008/0277264 A1 | 11/2008 | Sprague |
| 2008/0277266 A1 | 11/2008 | Layman |
| 2008/0277267 A1 | 11/2008 | Biberger et al. |
| 2008/0277268 A1 | 11/2008 | Layman |
| 2008/0277269 A1 | 11/2008 | Layman et al. |
| 2008/0277270 A1 | 11/2008 | Biberger et al. |
| 2008/0277271 A1 | 11/2008 | Layman |
| 2008/0280049 A1 | 11/2008 | Kevwitch et al. |
| 2008/0280751 A1 | 11/2008 | Harutyunyan et al. |
| 2008/0280756 A1 | 11/2008 | Biberger et al. |
| 2008/0283411 A1 | 11/2008 | Eastman et al. |
| 2008/0283498 A1 | 11/2008 | Yamazaki |
| 2008/0307960 A1 | 12/2008 | Hendrickson et al. |
| 2009/0010801 A1 | 1/2009 | Murphy et al. |
| 2009/0018008 A1 | 1/2009 | Jankowiak et al. |
| 2009/0054230 A1 | 2/2009 | Veeraraghavan et al. |
| 2009/0081092 A1 | 3/2009 | Yang et al. |
| 2009/0088585 A1 | 4/2009 | Schammel et al. |
| 2009/0092887 A1 | 4/2009 | McGrath et al. |
| 2009/0098402 A1 | 4/2009 | Kang et al. |
| 2009/0114568 A1 | 5/2009 | Trevino et al. |
| 2009/0162991 A1 | 6/2009 | Beneyton et al. |
| 2009/0168506 A1 | 7/2009 | Han et al. |
| 2009/0170242 A1 | 7/2009 | Lin et al. |
| 2009/0181474 A1 | 7/2009 | Nagai |
| 2009/0200180 A1 | 8/2009 | Capote et al. |
| 2009/0208367 A1 | 8/2009 | Calio et al. |
| 2009/0209408 A1 | 8/2009 | Kitamura et al. |
| 2009/0223410 A1 | 9/2009 | Jun et al. |
| 2009/0238736 A1 | 9/2009 | Takahashi |
| 2009/0253037 A1 | 10/2009 | Park et al. |
| 2009/0274897 A1 | 11/2009 | Kaner et al. |
| 2009/0274903 A1 | 11/2009 | Addiego |
| 2009/0286899 A1 | 11/2009 | Hofmann et al. |
| 2009/0320449 A1 | 12/2009 | Beutel et al. |
| 2009/0324468 A1 | 12/2009 | Golden et al. |
| 2010/0050868 A1 | 3/2010 | Kuznicki et al. |
| 2010/0089002 A1 | 4/2010 | Merkel |
| 2010/0092358 A1 | 4/2010 | Koegel et al. |
| 2010/0124514 A1 | 5/2010 | Chelluri et al. |
| 2010/0166629 A1 | 7/2010 | Deeba |
| 2010/0180581 A1 | 7/2010 | Grubert et al. |
| 2010/0180582 A1 | 7/2010 | Mueller-Stach et al. |
| 2010/0186375 A1 | 7/2010 | Kazi et al. |
| 2010/0240525 A1 | 9/2010 | Golden et al. |
| 2010/0260652 A1 | 10/2010 | Nakane et al. |
| 2010/0275781 A1 | 11/2010 | Tsangaris |
| 2010/0323118 A1 | 12/2010 | Mohanty et al. |
| 2011/0006463 A1 | 1/2011 | Layman |
| 2011/0030346 A1 | 2/2011 | Neubauer et al. |
| 2011/0049045 A1 | 3/2011 | Hurt et al. |
| 2011/0052467 A1 | 3/2011 | Chase et al. |
| 2011/0143041 A1 | 6/2011 | Layman et al. |
| 2011/0143915 A1 | 6/2011 | Yin et al. |
| 2011/0143916 A1 | 6/2011 | Leamon |
| 2011/0143926 A1 | 6/2011 | Yin et al. |
| 2011/0143930 A1 | 6/2011 | Yin et al. |
| 2011/0143933 A1 | 6/2011 | Yin et al. |
| 2011/0144382 A1 | 6/2011 | Yin et al. |
| 2011/0152550 A1 | 6/2011 | Grey et al. |
| 2011/0154807 A1 | 6/2011 | Chandler et al. |
| 2011/0158871 A1 | 6/2011 | Arnold et al. |
| 2011/0174604 A1 | 7/2011 | Duesel et al. |
| 2011/0243808 A1 | 10/2011 | Fossey et al. |
| 2011/0245073 A1 | 10/2011 | Oljaca et al. |
| 2011/0247336 A9 | 10/2011 | Farsad et al. |
| 2011/0271658 A1 | 11/2011 | Hoyer et al. |
| 2011/0305612 A1 | 12/2011 | Müller-Stach et al. |
| 2012/0023909 A1 | 2/2012 | Lambert et al. |
| 2012/0045373 A1 | 2/2012 | Biberger |
| 2012/0063963 A1 | 3/2012 | Watanabe et al. |
| 2012/0097033 A1 | 4/2012 | Arnold et al. |
| 2012/0122660 A1 | 5/2012 | Andersen et al. |
| 2012/0124974 A1 | 5/2012 | Li et al. |
| 2012/0171098 A1 | 7/2012 | Hung et al. |

(56) References Cited

U.S. PATENT DOCUMENTS

| | | |
|---|---|---|
| 2012/0214666 A1 | 8/2012 | van den Hoek et al. |
| 2012/0263633 A1 | 10/2012 | Koplin et al. |
| 2012/0285548 A1 | 11/2012 | Layman et al. |
| 2012/0308467 A1 | 12/2012 | Carpenter et al. |
| 2012/0313269 A1 | 12/2012 | Kear et al. |
| 2013/0034472 A1 | 2/2013 | Cantrell et al. |
| 2013/0064750 A1 | 3/2013 | Zettl |
| 2013/0079216 A1 | 3/2013 | Biberger et al. |
| 2013/0125970 A1 | 5/2013 | Ko et al. |
| 2013/0213018 A1 | 8/2013 | Yin et al. |
| 2013/0270355 A1 | 10/2013 | Cotler et al. |
| 2013/0280528 A1 | 10/2013 | Biberger |
| 2013/0281288 A1 | 10/2013 | Biberger et al. |
| 2013/0294989 A1 | 11/2013 | Koch et al. |
| 2013/0316896 A1 | 11/2013 | Biberger |
| 2013/0331257 A1 | 12/2013 | Barcikowski et al. |
| 2013/0345047 A1 | 12/2013 | Biberger et al. |
| 2014/0018230 A1 | 1/2014 | Yin et al. |
| 2014/0120355 A1 | 5/2014 | Biberger |
| 2014/0128245 A1 | 5/2014 | Yin et al. |
| 2014/0140909 A1 | 5/2014 | Qi et al. |
| 2014/0148331 A1 | 5/2014 | Biberger et al. |
| 2014/0161693 A1 | 6/2014 | Brown et al. |
| 2014/0209451 A1 | 7/2014 | Biberger et al. |
| 2014/0228201 A1 | 8/2014 | Mendoza Gómez et al. |
| 2014/0243187 A1 | 8/2014 | Yin et al. |
| 2014/0249021 A1 | 9/2014 | van den Hoek et al. |
| 2014/0252270 A1 | 9/2014 | Lehman, Jr. |
| 2014/0263190 A1 | 9/2014 | Biberger et al. |
| 2014/0318318 A1 | 10/2014 | Layman et al. |
| 2014/0338519 A1 | 11/2014 | Biberger |
| 2015/0093312 A1 | 4/2015 | Yin et al. |
| 2015/0140317 A1 | 5/2015 | Biberger et al. |
| 2015/0165418 A1 | 6/2015 | Kearl et al. |
| 2015/0165434 A1 | 6/2015 | Yin et al. |
| 2015/0196884 A1 | 7/2015 | Layman |
| 2015/0217229 A1 | 8/2015 | Yin et al. |
| 2015/0266002 A1 | 9/2015 | Biberger et al. |
| 2015/0314260 A1 | 11/2015 | Biberger |
| 2015/0314581 A1 | 11/2015 | Biberger |

FOREIGN PATENT DOCUMENTS

| | | |
|---|---|---|
| CN | 101301610 A | 11/2008 |
| DE | 34 45 273 A1 | 6/1986 |
| EP | 0 347 386 A1 | 12/1989 |
| EP | 0 385 742 A1 | 9/1990 |
| EP | 1 134 302 A1 | 9/2001 |
| EP | 1 256 378 A2 | 11/2002 |
| EP | 1 619 168 A1 | 1/2006 |
| EP | 1 721 690 A1 | 11/2006 |
| EP | 1 790 612 A1 | 5/2007 |
| EP | 1 955 765 A1 | 8/2008 |
| GB | 1 307 941 A | 2/1973 |
| JP | 30-13577 U | 9/1955 |
| JP | 47-21256 U | 2/1971 |
| JP | 49-31571 A | 3/1974 |
| JP | 51-7582 U | 7/1974 |
| JP | 52-165360 U | 6/1976 |
| JP | 56-146804 A | 11/1981 |
| JP | 58-160794 A | 9/1983 |
| JP | 59-59410 A | 4/1984 |
| JP | 61-086815 A | 5/1986 |
| JP | 61-242644 A | 10/1986 |
| JP | 62-102827 A | 5/1987 |
| JP | 63-214342 A | 9/1988 |
| JP | 1-164795 A | 6/1989 |
| JP | 1-275708 A | 11/1989 |
| JP | 2-6339 A | 1/1990 |
| JP | 2-160040 A | 6/1990 |
| JP | 2-203932 A | 8/1990 |
| JP | 3-226509 A | 10/1991 |
| JP | 5-193909 A | 8/1993 |
| JP | 05-228361 A | 9/1993 |
| JP | 05-324094 A | 12/1993 |
| JP | 6-91162 A | 4/1994 |
| JP | 6-93309 A | 4/1994 |
| JP | 6-135797 A | 5/1994 |
| JP | 6-172820 A | 6/1994 |
| JP | 6-272012 A | 9/1994 |
| JP | H6-065772 U | 9/1994 |
| JP | 07-031873 A | 2/1995 |
| JP | 7-20553 B2 | 3/1995 |
| JP | 7-120176 A | 5/1995 |
| JP | 7-138020 A | 5/1995 |
| JP | 7-207381 A | 8/1995 |
| JP | 07-256116 A | 10/1995 |
| JP | 8-158033 A | 6/1996 |
| JP | 8-215576 A | 8/1996 |
| JP | 8-217420 A | 8/1996 |
| JP | 9-141087 A | 6/1997 |
| JP | 10-130810 A | 5/1998 |
| JP | 10-249198 A | 9/1998 |
| JP | 11-502760 A | 3/1999 |
| JP | 11-300198 A | 11/1999 |
| JP | 2000-220978 A | 8/2000 |
| JP | 2002-88486 A | 3/2002 |
| JP | 2002-241812 A | 8/2002 |
| JP | 2002-263496 A | 9/2002 |
| JP | 2002-336688 A | 11/2002 |
| JP | 2003-126694 A | 5/2003 |
| JP | 2003-261323 A | 9/2003 |
| JP | 2004-233007 A | 8/2004 |
| JP | 2004-249206 A | 9/2004 |
| JP | 2004-290730 A | 10/2004 |
| JP | 2005-503250 A | 2/2005 |
| JP | 2005-122621 A | 5/2005 |
| JP | 2005-218937 A | 8/2005 |
| JP | 2005-342615 A | 12/2005 |
| JP | 2006-001779 A | 1/2006 |
| JP | 2006-508885 A | 3/2006 |
| JP | 2006-87965 A | 4/2006 |
| JP | 2006-247446 A | 9/2006 |
| JP | 2006-260385 A | 9/2006 |
| JP | 2006-272265 A | 10/2006 |
| JP | 2006-326554 A | 12/2006 |
| JP | 2007-29859 A | 2/2007 |
| JP | 2007-44585 A | 2/2007 |
| JP | 2007-46162 A | 2/2007 |
| JP | 2007-138287 A | 6/2007 |
| JP | 2007-203129 A | 8/2007 |
| SU | 493241 A | 3/1976 |
| TW | 200611449 | 4/2006 |
| TW | 201023207 | 6/2010 |
| WO | WO-96/28577 A1 | 9/1996 |
| WO | WO-00/16882 | 3/2000 |
| WO | WO-00/72965 A1 | 12/2000 |
| WO | WO-02/092503 A1 | 11/2002 |
| WO | WO-03/094195 A1 | 11/2003 |
| WO | WO-2004/052778 A2 | 6/2004 |
| WO | WO-2005/063390 A1 | 7/2005 |
| WO | WO-2006/079213 A1 | 8/2006 |
| WO | WO-2006/096205 A2 | 9/2006 |
| WO | WO-2007/144447 A1 | 12/2007 |
| WO | WO-2008/088649 A1 | 7/2008 |
| WO | WO-2008/092478 A1 | 8/2008 |
| WO | WO-2008/130451 A2 | 10/2008 |
| WO | WO-2008/130451 A3 | 10/2008 |
| WO | WO-2009/017479 A1 | 2/2009 |
| WO | WO-2011/081833 A1 | 7/2011 |
| WO | WO-2011/081834 A1 | 7/2011 |
| WO | WO-2012/028695 A2 | 3/2012 |
| WO | WO-2013/028575 A1 | 2/2013 |
| WO | WO-2013/093597 A2 | 6/2013 |
| WO | WO-2013/151557 A1 | 10/2013 |

OTHER PUBLICATIONS

Babin, A. et al. (1985). "Solvents Used in the Arts," *Center for Safety in the Arts*: 16 pages.

Bateman, J. E. et al. (Dec. 17, 1998). "Alkylation of Porous Silicon by Direct Reaction with Alkenes and Alkynes," *Angew. Chem Int. Ed.* 37(19):2683-2685.

(56) References Cited

OTHER PUBLICATIONS

Carrot, G. et al. (Sep. 17, 2002). "Surface-Initiated Ring-Opening Polymerization: A Versatile Method for Nanoparticle Ordering," *Macromolecules* 35(22):8400-8404.

Chaim, R. et al. (2009). "Densification of Nanocrystalline $Y_2O_3$ Ceramic Powder by Spark Plasma Sintering," *Journal of European Ceramic Society* 29: 91-98.

Chau, J. K. H. et al. (2005). "Microwave Plasma Synthesis of Silver Nanopowders," *Materials Letters* 59: 905-908.

Chen, H.-S. et al. (Jul. 3, 2001). "On the Photoluminescence of Si Nanoparticles," *Mater. Phys. Mech.* 4:62-66.

Chen, W.-J. et al. (Mar. 18, 2008). "Functional $Fe_3O_4/TiO_2$ Core/Shell Magnetic Nanoparticles as Photokilling Agents for Pathogenic Bacteria," *Small* 4(4): 485-491.

Das, N. et al. (2001). "Influence of the Metal Function in the "One-Pot" Synthesis of 4-Methyl-2-Pentanone (Methyl Isobutyl Ketone) from Acetone Over Palladium Supported on Mg(Al)O Mixed Oxides Catalysts," *Catalysis Letters* 71(3-4): 181-185.

Faber, K. T. et al. (Sep. 1988). "Toughening by Stress-Induced Microcracking in Two-Phase Ceramics," *Journal of the American Ceramic Society* 71: C-399-C401.

Fauchais, P. et al. (Jun. 1989). "La Projection Par Plasma: Une Revue," *Ann. Phys. Fr.* 14(3):261-310.

Fauchais, P. et al. (Jan. 1993). "Les Dépôts Par Plasma Thermique," *Revue Générale De L'Electricité*, RGE, Paris, France, No. 2, pp. 7-12 (in French).

Fauchais, P. et al. (Jan. 1996). "Plasma Spray: Study of the Coating Generation," *Ceramics International* 22(4):295-303.

Fojtik, A. et al. (Apr. 29, 1994). "Luminescent Colloidal Silicon Particles," *Chemical Physics Letters* 221:363-367.

Fojtik, A. (Jan. 13, 2006). "Surface Chemistry of Luminescent Colloidal Silicon Nanoparticles," *J. Phys. Chem. B.* 110(5):1994-1998.

Gangeri, M. et al. (2009). "Fe and Pt Carbon Nanotubes for the Electrocatalytic Conversion of Carbon Dioxide to Oxygenates," *Catalysis Today* 143: 57-63.

Gutsch, A. et al. (2002). "Gas-Phase Production of Nanoparticles," *Kona* No. 20, pp. 24-37.

Han, B. Q. et al. (Jan. 2004). "Deformation Mechanisms and Ductility of Nanostructured Al Alloys", *Mat. Res. Soc. Symp. Proc.* 821:p. 9.1.1-p. 9.1.6.

Heberlein, J. (2002). "New Approaches in Thermal Plasma Technology", *Pure Appl. Chem.* 74(3):327-335.

Hua, F. et al. (Mar. 2006). "Organically Capped Silicon Nanoparticles With Blue Photoluminescence Prepared by Hydrosilylation Followed by Oxidation," *Langmuir* 22(9):4363-4370.

Ihlein, G. et al.(1998). "Ordered Porous Materials as Media for the Organization of Matter on the Nanoscale," *Applied Organometallic Chemistry* 12: 305-314.

Ji, Y. et al. (Nov. 2002) "Processing and Mechanical Properties of $Al_2O_3$-5 vol.% Cr Nanocomposites," *Journal of the European Ceramic Society* 22(12):1927-1936.

Jouet, R. J. et al. (Jan. 25, 2005). "Surface Passivation of Bare Aluminum Nanoparticles Using Perfluoroalkyl Carboxylic Acids," *Chem. Mater.*17(11):2987-2996.

Kenvin, J. C. et al. (1992). "Supported Catalysts Prepared from Mononuclear Copper Complexes: Catalytic Properties", *J. Catalysis* 135:81-91.

Konrad, H. et al. (1996). "Nanostructured Cu—Bi Alloys Prepared by Co-Evaporation in a Continuous Gas Flow," *NanoStructured Materials* 7(6):605-610.

Kim, N. Y. et al. (Mar. 5, 1997). "Thermal Derivatization of Porous Silicon with Alcohols," *J. Am. Chem. Soc.* 119(9):2297-2298.

Kwon, Y.-S. et al. (Apr. 30, 2003). "Passivation Process for Superfine Aluminum Powders Obtained by Electrical Explosion of Wires," *Applied Surface Science* 211:57-67.

Lakis, R. E. et al. (1995). "Alumina-Supported Pt—Rh Catalysts: I. Microstructural Characterization," *Journal of Catalysis* 154: 261-275.

Langner, A. et al. (Aug. 25, 2005). "Controlled Silicon Surface Functionalization by Alkene Hydrosilylation," *J. Am. Chem. Soc.* 127(37):12798-12799.

Li, D. et al. (Apr. 9, 2005). "Environmentally Responsive "Hairy" Nanoparticles: Mixed Homopolymer Brushes on Silica Nanoparticles Synthesized by Living Radical Polymerization Techniques," *J. Am. Chem. Soc.* 127(7):6248-6256.

Li, X. et al. (May 25, 2004). "Surface Functionalization of Silicon Nanoparticles Produced by Laser-Driven Pyrolysis of Silane Followed by HF—$HNO_3$ Etching," *Langmuir* 20(11):4720-4727.

Liao, Y.-C. et al. (Jun. 27, 2006). "Self-Assembly of Organic Monolayers on Aerosolized Silicon Nanoparticles," *J.Am. Chem. Soc.* 128(28):9061-9065.

Liu, S.-M. et al. (Jan. 13, 2006). "Enhanced Photoluminescence from Si Nano-Organosols by Functionalization With Alkenes and Their Size Evolution," *Chem. Mater.* 18(3):637-642.

Luo, J. et al. (2008). "Core/Shell Nanoparticles as Electrocatalysts for Fuel Cell Reactions," *Advanced Materials* 20: 4342-4347.

Mignard, D. et al. (2003). "Methanol Synthesis from Flue-Gas $CO_2$ and Renewable Electricity: A Feasibility Study," *International Journal of Hydrogen Energy* 28: 455-464.

Mühlenweg, H. et al. (2004). "Gas-Phase Reactions—Open Up New Roads to Nanoproducts," *Degussa ScienceNewsletter* No. 08, pp. 12-16.

Nagai, Y. et al. (Jul. 3, 2006). "Sintering Inhibition Mechanism of Platinum Supported on Ceria-Based Oxide and Pt-Oxide-Support Interaction," *J. Catalysis* 242:103-109.

NASA (2009). "Enthalpy," Article located at http://www.grc.nasa.gov/WWW/K-12/airplane/enthalpy.htrnl, published by National Aeronautics and Space Administration on Nov. 23, 2009, 1 page.

Neiner, D. (Aug. 5, 2006). "Low-Temperature Solution Route to Macroscopic Amounts of Hydrogen Terminated Silicon Nanoparticles," *J. Am. Chem. Soc.* 128:11016-11017.

Netzer, L. et al. (1983). "A New Approach to Construction of Artificial Monolayer Assemblies," *J. Am. Chem. Soc.* 105(3):674-676.

Park, H.-Y. et al. (May 30, 2007). "Fabrication of Magnetic Core@Shell Fe Oxide@Au Nanoparticles for Interfacial Bioactivity and Bio-Separation," *Langmuir* 23: 9050-9056.

Park, N.-G. et al. (Feb. 17, 2004). "Morphological and Photoelectrochemical Characterization of Core-Shell Nanoparticle Films for Dye-Sensitized Solar Cells: Zn—O Type Shell on $SnO_2$ and $TiO_2$ Cores," *Langmuir* 20: 4246-4253.

"Plasma Spray and Wire Flame Spray Product Group," located at http://www.processmaterials.com/spray.html, published by Process Materials, Inc., last accessed Aug. 5, 2013, 2 pages.

"Platinum Group Metals: Annual Review 1996" (Oct. 1997). Engineering and Mining Journal, p. 63.

Rahaman, R. A. et al. (1995). "Synthesis of Powders," in *Ceramic Processing and Sintering*. Marcel Decker, Inc., NewYork, pp. 71-77.

Sailor, M. J. (1997). "Surface Chemistry of Luminescent Silicon Nanocrystallites," *Adv. Mater.* 9(10):783-793.

Schimpf, S. et al. (2002). "Supported Gold Nanoparticles: In-Depth Catalyst Characterization and Application in Hydrogenation and Oxidation Reactions," *Catalysis Today* 2592: 1-16.

Stiles, A. B. (Jan. 1, 1987). "Manufacture of Carbon-Supported Metal Catalysts," in *Catalyst Supports and Supported Catalysts*, Butterworth Publishers, MA, pp. 125-132.

Subramanian, S. et al. (1991). "Structure and Activity of Composite Oxide Supported Platinum—Iridium Catalysts," *Applied Catalysts* 74: 65-81.

Tao, Y.-T. (May 1993). "Structural Comparison of Self-Assembled Monolayers of *n*-Alkanoic Acids on the surfaces of Silver, Copper, and Aluminum," *J. Am. Chem. Soc.* 115(10):4350-4358.

Ünal, N. et al. (Nov. 2011). "Influence of WC Particles on the Microstructural and Mechanical Properties of 3 mol% $Y_2O_3$ Stabilized $ZrO_2$ Matrix Composites Produced by Hot Pressing," *Journal of the European Ceramic Society* (31)13: 2267-2275.

Vardelle, A. et al. (1996). "Coating Generation: Vaporization of Particles in Plasma Spraying and Splat Formation," Universite de Limoges, 123 Avenue A. Thomas 87000, Limoges, France, *Pure & Appl. Chem.* 68(5):1093-1099.

(56) References Cited

OTHER PUBLICATIONS

Vardelle, M. et al. (Jun. 1991). "Experimental Investigation of Powder Vaporization in Thermal Plasma Jets," *Plasma Chemistry and Plasma Processing* 11(2):185-201.

Viswanathan, V. et al. (2006). "Challenges and Advances in Nanocomposite Processing Techniques," *Materials Science and Engineering* R 54: 121-285.

Wan, J. et al. (2005). "Spark Plasma Sintering of Silicon Nitride/Silicon Carbide Nanocomposites with Reduced Additive Amounts," *Scripta Materialia* 53: 663-667.

Yoshida, T. (1994). "The Future of Thermal Plasma Processing for Coating", *Pure & Appl. Chem.* 66(6):1223-1230.

Zou, J. et al. (Jun. 4, 2004). "Solution Synthesis of Ultrastable Luminescent Siloxane-Coated Silicon Nanoparticles," *Nano Letters* 4(7):1181-1186.

International Search Report mailed on Feb. 3, 2011, for PCT Patent Application No. PCT/US2010/059760, filed Dec. 9, 2010, published on Jun. 23, 2011, as WO 2011/75399, 1 page.

Written Opinion mailed on Feb. 3, 2011, for PCT Patent Application No. PCT/US2010/059760, filed Dec. 9, 2010, published on Jun. 23, 2011, as WO 2011/75399, 13 pages.

U.S. Appl. No. 13/291,983, filed Nov. 8, 2011, for Layman et al.
U.S. Appl. No. 12/152,084, filed May 9, 2008, for Biberger.
U.S. Appl. No. 13/028,693, filed Feb. 16, 2011, for Biberger.
U.S. Appl. No. 12/943,909, filed Nov. 10, 2010, for Layman.
U.S. Appl. No. 12/152,111, filed May 9, 2008, for Biberger et al.
U.S. Appl. No. 12/151,830, filed May 8, 2008, for Biberger et al.
U.S. Appl. No. 12/968,248, filed Dec. 14, 2010, for Biberger.
U.S. Appl. No. 12/968,245, filed Dec. 14, 2010, for Biberger.
U.S. Appl. No. 12/968,241, filed Dec. 14, 2010, for Biberger.
U.S. Appl. No. 12/968,239, filed Dec. 14, 2010, for Biberger.
U.S. Appl. No. 12/969,128, filed Dec. 15, 2010, for Biberger.
U.S. Appl. No. 12/962,463, filed Dec. 7, 2010, for Leamon.
U.S. Appl. No. 12/961,030, filed Dec. 6, 2010, for Lehman.
U.S. Appl. No. 12/961,108, filed Dec. 6, 2010, for Lehman.
U.S. Appl. No. 12/961,200, filed Dec. 6, 2010, for Lehman.
U.S. Appl. No. 12/968,253, filed Dec. 14, 2010, for Biberger.
U.S. Appl. No. 12/968,235, filed Dec. 14, 2010, for Biberger.
U.S. Appl. No. 12/969,306, filed Dec. 15, 2010, for Lehman et al.
U.S. Appl. No. 12/969,447, filed Dec. 15, 2010, for Biberger et al.
U.S. Appl. No. 12/969,087, filed Dec. 15, 2010, for Biberger.
U.S. Appl. No. 12/962,533, filed Dec. 7, 2010, for Yin et al.
U.S. Appl. No. 12/962,523, filed Dec. 7, 2010, for Yin et al.
U.S. Appl. No. 12/001,643, filed Dec. 11, 2007, for Biberger et al.
U.S. Appl. No. 12/474,081, filed May 28, 2009, for Biberger et al.
U.S. Appl. No. 12/001,602, filed Dec. 11, 2007, for Biberger et al.
U.S. Appl. No. 12/001,644, filed Dec. 11, 2007, for Biberger et al.
U.S. Appl. No. 12/969,457, filed Nov. 15, 2010, for Leamon et al.
U.S. Appl. No. 12/969,503, filed Nov. 15, 2010, for Leamon et al.
U.S. Appl. No. 12/954,813, filed Nov. 26, 2010, for Biberger.
U.S. Appl. No. 12/954,822, filed Nov. 26, 2010, for Biberger.

Büchel, R. et al. (2009). "Influence of Pt Location on $BaCO_3$ or $Al_2O_3$ During NO Storage Reduction," *Journal of Catalysis* 261: 201-207.

Date, A. R. et al. (1987). "The Potential of Fire Assay and Inductively Coupled Plasama Source Mass Spectrometry for the Determination of Platinum Group Elements in Geological Materials," *Analyst* 112: 1217-1222.

Lamouroux, E. et al. (2007). "Identification of Key Parameters for the Selective Growth of Single or Double Wall Carbon Nanotubes on $FeMo/Al_2O_3$ CVD Catalysts," *Applied Catalysts A: General* 323: 162-173.

Martinez-Hansen, V. et al. (2009). "Development of Aligned Carbon Nanotubes Layers Over Stainless Steel Mesh Monoliths," *Catalysis Today* 1475: 571-575.

Panchula, M. L. et al. (2003). "Nanocrystalline Aluminum Nitride: I, Vapor-Phase Synthesis in a Forced-Flow Reactor," *Journal of the American Ceramic Society* 86(7): 1114-1120.

Strobel, R. et al. (2003). "Flame-made Platinum/Alumina: Structural Properties and Catalytic Behaviour in Enantioselective Hydrogenation," *Journal of Catalysis* 213: 296-304.

Birlik, I. et al. (Jun. 15, 2010). "Nanoparticle Doped YBCO Films Prepared by Chemical Solution Deposition Method," *6th Nanoscience and Nanotechnology Conference*, Izmir, Turkey: 1 page.

COSPHERIC LLC. (Mar. 13, 2010). "Porous Ceramics: Application for Polyethylene Microspheres," Microspheres Online, located at http://microspheres.us/microsphere-manufacturing/porous-ceramics-polyethylene-microspheres/177.html, last accessed Mar. 17, 2015, 6 pages.

Jensen, J. et al. (2000). "Preparation of $ZnO$—$Al_2O_3$ Particles in a Premixed Flame," *Journal of Nanoparticle Research* 2: 363-373.

\* cited by examiner

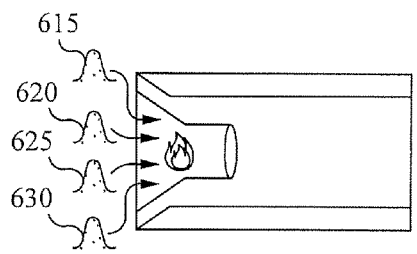
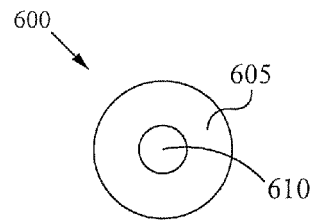
Fig. 6A                    Fig. 6B
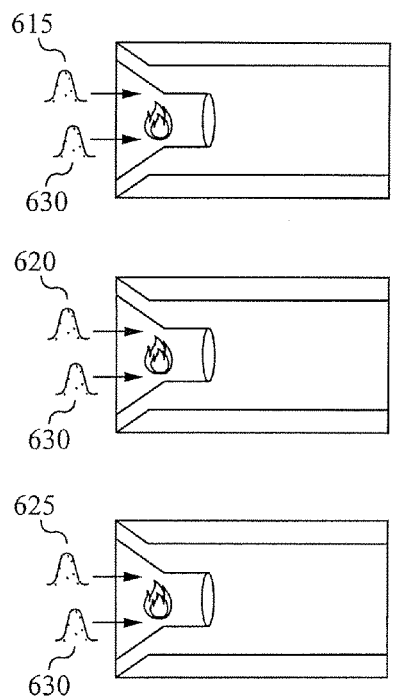
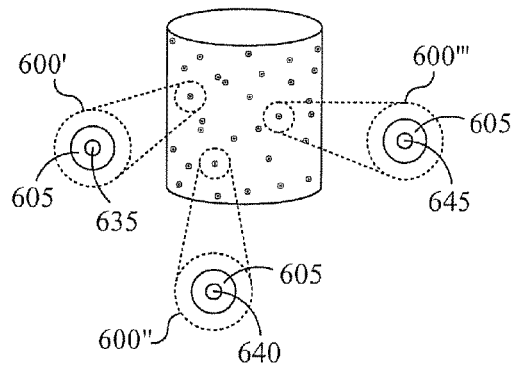
Fig. 7A                    Fig. 7B

US 9,308,524 B2

ADVANCED CATALYSTS FOR AUTOMOTIVE APPLICATIONS

CROSS-REFERENCE TO RELATED APPLICATIONS

This application is a divisional of U.S. patent application Ser. No. 12/962,490, filed Dec. 7, 2010 which claims priority to U.S. Provisional Patent Application Ser. No. 61/284,329, filed Dec. 15, 2009 and entitled "MATERIALS PROCESSING," which are hereby incorporated herein by reference in their entirety as if set forth herein.

BACKGROUND OF THE INVENTION

A catalytic converter for a car uses a catalyst to convert, for example, three harmful compounds in car exhaust into less harmful compounds. The three harmful compounds include hydrocarbons in the form of unburned gasoline, carbon monoxide formed by the combustion of gasoline, and nitrogen oxide created when heat in the engine forces nitrogen in the air to combine with oxygen. There are two main structures used in catalytic converters—honeycomb and ceramic beads. Most automobiles today use the honeycomb structure. The honeycomb structure is housed in a muffler-like package that comes before the exhaust pipe. The catalyst helps to convert carbon monoxide into carbon dioxide, the hydrocarbons into carbon dioxide and water, and the nitrogen oxides back into nitrogen and oxygen.

Various methods of manufacturing the catalyst used in the catalytic converter exist in the art. FIG. 1A illustrates a first conventional method of manufacturing the catalyst. The first method is known as a one-dip process. At a step 105, micron-sized platinum (Pt) ions are impregnated into micron-sized alumina ($Al_2O_3$) ions, resulting in micro-particles. The micro-particles have platinum atoms on the alumina ions. At a step 110, a wash coat is made using micron-sized oxides that include pint size alumina and pint size silica ($SiO_2$), a certain amount of stabilizers for the alumina, and a certain amount of promoters. At a step 115, the micro-particles are mixed together with the wash coat. At a step 120, a cylindrical-shaped ceramic monolith is obtained. A cross-section of the monolith contains 300-600 channels per square inch. The channels are linear square channels that run from the front to the back of the monolith. At a step 125, the monolith is coated with the wash coat. This can be achieved by dipping the monolith in the wash coat. As such, the channels of the monolith are coated with a layer of wash coat. At a step 130, the monolith is dried. The layer of wash coat has an irregular surface, which has a far greater surface area than a flat surface. In addition, the wash coat when dried is a porous structure. The irregular surface and the porous structure are desirable because they give a high surface area, approximately 100-250 $m^2/g$, and thus more places for the micro-particles to bond thereto. As the monolith dries, the micro-particles settle on the surface and pores of the monolith. At a step 135, the monolith is calcined. The calcination bonds the components of the wash coat to the monolith by oxide to oxide coupling. The catalyst is formed. FIG. 1B illustrates a microscopic view 145 of a channel of the monolith 140 that is coated with the layer of wash coat 150 having platinum atoms 155.

FIG. 2A illustrates a second conventional method of manufacturing the catalyst. The second method is known as a two-dip process. At a step 205, a wash coat is made using micron-sized oxides that include pint size alumina and pint size silica, a certain amount of stabilizers for the alumina, and a certain amount of promoters. At a step 210, a cylindrical-shaped ceramic monolith is obtained. At a step 215, the monolith is coated with the wash coat such as via dipping. As such, the channels are also coated with a layer of wash coat. Typically, the layer of wash coat has an irregular surface which has a far greater surface area than a flat surface. FIG. 2B illustrates a microscopic view 250 of a channel of the monolith 245 coated with the layer of the wash coat 255. Returning to FIG. 2A, at a step 220, the monolith is dried. The wash coat when dried is a porous structure. At a step 225, the monolith is calcined. The calcination bonds the components of the wash coat to the monolith by oxide to oxide coupling. Micron-sized alumina oxides are then impregnated with micron-sized platinum ions and other promoters using a method that is well known in the art. Specifically, at a step 230, platinum is nitrated, forming salt ($PtNO_3$). The $PtNO_3$ is dissolved in a solvent such as water, thereby creating a dispersion. At step 235, the monolith is dipped into the solution. At a step 240, the monolith is dried. At a step 245, the monolith is calcined. The catalyst is formed. FIG. 2C illustrates another microscopic view 250' of the channel of the monolith 245' coated with the layer of wash coat 255' having platinum atoms 260.

FIG. 3A illustrates a microscopic view 305 of a surface of the layer of the wash coat after calcination. Platinum atoms 310 are attached to oxygen atoms of the alumina. When exhaust gas goes through the catalytic converter, the platinum atoms 310 help reduce the harmful compounds by converting them into less harmful compounds. However, these various methods of manufacturing the catalyst used in the catalytic converter suffer from a number of shortcomings. For example, the platinum atoms 310 are not fixed to their bonded oxygen atoms of the alumina and are able to move around to other available oxygen atoms as illustrated in FIGS. 3B-3C. As the platinum atoms 310 move, the platinum atoms 310 begin to coalesce with other platinum atoms resulting in larger particles 315, as shown in FIG. 3D, and a more energetically favorable state. It is understood that as the platinum particles become larger, it detrimentally affects the catalyst since surface area of the platinum atoms decreases. In high temperature applications, such as in an aged catalytic converting testing, the movement of platinum atoms is magnified. In addition, since cost of platinum is extremely expensive, excessive use of platinum is unwanted.

The present invention addresses at least these limitations in the prior art.

SUMMARY OF THE INVENTION

In one aspect, a catalytic converter includes a honeycomb structure with an at least one nano-particle on the honeycomb structure. In some embodiments, the at least one nano-particle includes nano-active material and nano-support. The nano-active material is typically on the nano-support. The nano-active material is platinum, palladium, rhodium, or an alloy. The alloy is of platinum, palladium, and rhodium. The nano-support is alumina. In other embodiments, the nano-support includes a partially reduced alumina surface, which limits movement of the nano-active material on a surface of the nano-support.

In another aspect, a cordierite substrate in a catalytic converter includes a first type of nano-particles, a second type of nano-particles, and a third type of nano-particles. In some embodiments, the first type of nano-particles includes nano-active material and nano-support. The nano-active material is platinum and the nano-support is alumina. The nano-support includes a partially reduced alumina surface, which limits movement of the nano-active material on a surface of the nano-support. In other embodiments, the second type of nano-particles comprises nano-active material and nano-support. The nano-active material is palladium and the nano-support is alumina. The nano-support includes a partially reduced alumina surface, which limits movement of the nano-active material on a surface of the nano-support. In other embodiments, the third type of nano-particles comprises nano-active material and nano-support. The nano-active material is rhodium and the nano-support is alumina. The nano-support includes a partially reduced alumina surface, which limits movement of the nano-active material on a surface of the nano-support.

Yet, in another aspect, a method of making a catalytic converter includes creating a dispersion using an at least one nano-particle and obtaining a wash coat. In some embodiments, the at least one nano-particle includes nano-active material and nano-support. The nano-active material is platinum, palladium, rhodium, or an alloy. The nano-support is alumina. The nano-support includes a partially reduced alumina surface, which limits movement of the nano-active material on a surface of the nano-support. In other embodiments, the creating step comprises mixing a carrier material and different catalyst materials in a high temperature condensation technology, thereby producing the at least one nano-particle, and combining it with a liquid. The carrier material is alumina. The different catalyst materials include platinum, palladium, and rhodium. Typically, the high temperature condensation technology is plasma. Alternatively, the creating step comprises mixing a carrier material and a first catalyst material in a high temperature condensation technology, thereby producing a first type of nano-particles, mixing the carrier material and a second catalyst material in the high temperature condensation technology, thereby producing a second type of nano-particles, mixing the carrier material and a third catalyst material in the high temperature condensation technology, thereby producing a third type of nano-particles, collecting together the first type of nano-particles, the second type of nano-particles, and a third type of nano-particles, and combining with a liquid. The carrier material is alumina. The first catalyst material is platinum. The second catalyst material is palladium. The third catalyst material is rhodium.

Yet, in other embodiments, the method of making a catalytic converter further includes mixing the dispersion with the wash coat, applying the mix to a monolith, drying the monolith, and calcining the monolith. Alternatively, the method of making a catalytic converter further includes applying the wash coat to a monolith, drying the monolith, calcining the monolith, administering the dispersion to the monolith, drying the monolith, and calcining the monolith.

Yet, in another aspect, a method of making a three-way catalytic converter includes creating a dispersion by using different types of nano-particles, obtaining a wash coat, mixing the dispersion with the wash coat, applying the mix to a monolith, drying the monolith, and calcining the monolith. The creating step includes using a high temperature condensation technology. In some embodiments, the high temperature condensation technology is plasma. Each of the different types of nano-particles comprises nano-active material and nano-support. The nano-active material is platinum, palladium, rhodium, or an alloy. The nano-support is alumina. The nano-support includes a partially reduced alumina surface, which limits movement of the nano-active material on a surface of the nano-support.

Yet, in another aspect, a method of making a three-way catalytic converter includes creating a dispersion using different types of nano-particles, obtaining a wash coat, applying the wash coat to a monolith, drying the monolith, calcining the monolith, administering the dispersion to the monolith, drying the monolith, and calcining the monolith. The creating step includes using a high temperature condensation technology. In some embodiments, the high temperature condensation technology is plasma. Each of the different types of nano-particles includes nano-active material and nano-support. The nano-active material is platinum, palladium, rhodium, or an alloy. The nano-support is alumina. The nano-support includes a partially reduced alumina surface, which limits movement of the nano-active material on a surface of the nano-support.

Yet, in another aspect, a method of making a two-way catalytic converter includes creating a dispersion by using same type of nano-particles, obtaining a wash coat, mixing the dispersion with the wash coat, applying the mix to a monolith, drying the monolith, and calcining the monolith. The creating step includes using a high temperature condensation technology. In some embodiments, the high temperature condensation technology is plasma. Each of the same type of nano-particles includes nano-active material and nano-support. The nano-active material is platinum. The nano-support is alumina. The nano-support includes a partially reduced alumina surface, which limits movement of the nano-active material on a surface of the nano-support.

Yet, in another aspect, a method of making a two-way catalytic converter includes creating a dispersion using same type of nano-particles, obtaining a wash coat, applying the wash coat to a monolith, drying the monolith, calcining the monolith, administering the dispersion to the monolith, drying the monolith, and calcining the monolith. The creating step includes using a high temperature condensation technology. In some embodiments, the high temperature condensation technology is plasma. Each of the same type of nano-particles includes nano-active material and nano-support. The nano-active material is platinum. The nano-support is alumina. The nano-support includes a partially reduced alumina surface, which limits movement of the nano-active material on a surface of the nano-support.

BRIEF DESCRIPTION OF THE DRAWINGS

FIG. 6A illustrates a first method of creating a dispersion in accordance with the present invention.

FIG. 6B illustrates a nano-particle in accordance with the present invention.

FIG. 7A illustrates a second method of creating a dispersion in accordance with the present invention.

FIG. 7B illustrates a collection of different nano-particles in accordance with the present invention.

DETAILED DESCRIPTION OF THE INVENTION

Reference will now be made in detail to implementations of the present invention as illustrated in the accompanying drawings. The drawings may not be to scale. The same reference indicators will be used throughout the drawings and the following detailed description to refer to identical or like elements. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application, safety regulations and business related constraints, and that these specific goals will vary from one implementation to another and from one developer to another. Moreover, it will be appreciated that such a development effort will be a routine undertaking of engineering for those of ordinary skill in the art having the benefit of this disclosure.

The following description of the invention is provided as an enabling teaching which includes the best currently known embodiment. One skilled in the relevant arts, including but not limited to chemistry, physics and material sciences, will recognize that many changes can be made to the embodiment described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present inventions are possible and may even be desirable in certain circumstances, and are a part of the present invention. Thus, the following description is provided as illustrative of the principles of the present invention and not in limitation thereof, since the scope of the present invention is defined by the claims.

Harmful compounds from internal combustion engines include carbon monoxide (CO), hydrocarbons ($H_aC_b$), and oxides of nitrogen ($NO_x$). Two forms of internal combustion engines are diesel engines and gas engines. A catalytic converter is designed to reduce these harmful compounds by converting them into less harmful compounds. As discussed above, conventional catalysts used in catalytic converters use micro-particles such as micron-sized oxides and micron-sized catalyst materials (e.g. platinum). Embodiments of the present invention use nano-sized oxides and nano-sized catalyst materials to create advanced catalysts usable in catalytic converters of diesel engines and gas engines.

The term "nano-particle" is generally understood by those of ordinary skill to encompass a particle having a diameter in the order of nanometers, as described herein.

Diesel Engines

Figure 1A:
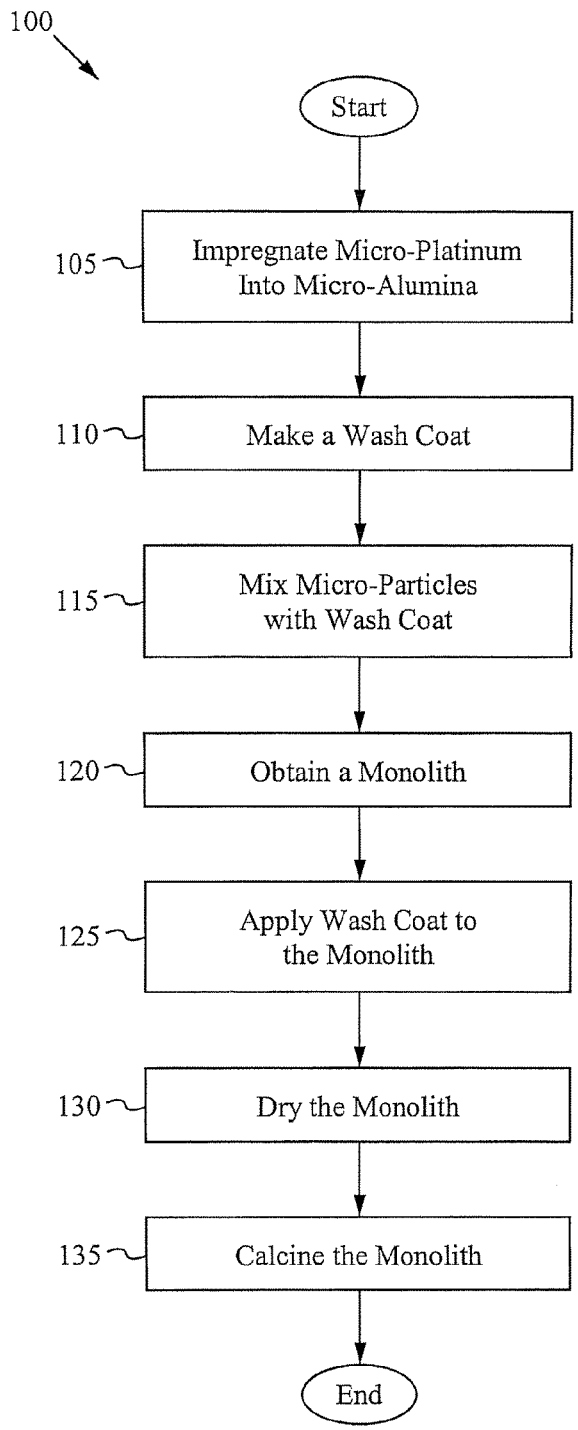
FIGS. 1A-1B illustrate a first conventional method of manufacturing a catalyst.
Figure 1B:
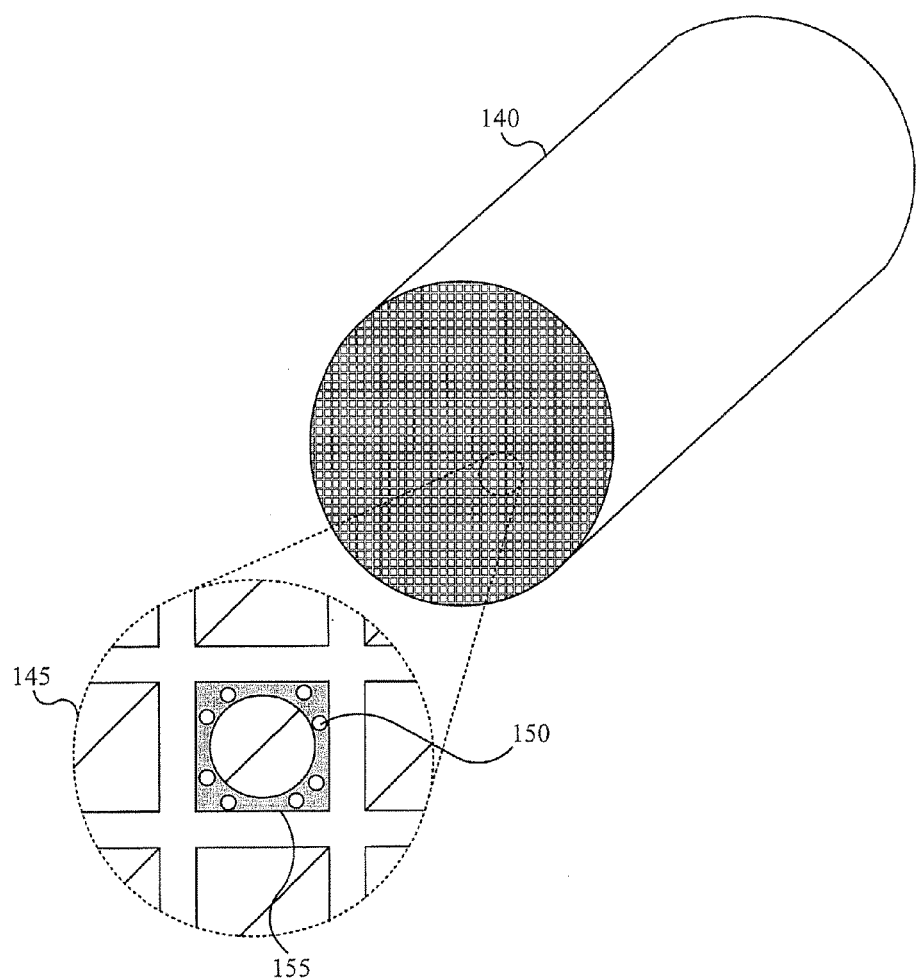
Figure 2A:
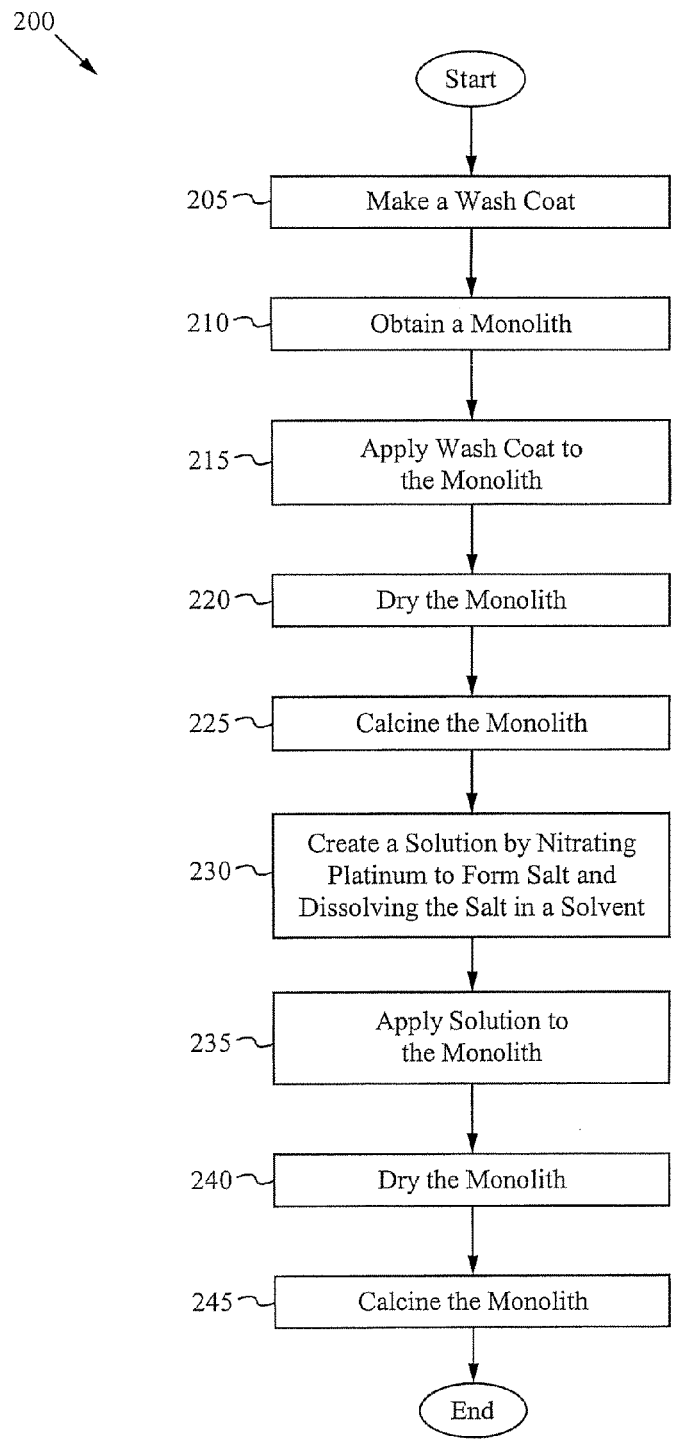
FIGS. 2A-2C illustrate a second conventional method of manufacturing the catalyst.
Figure 2B:
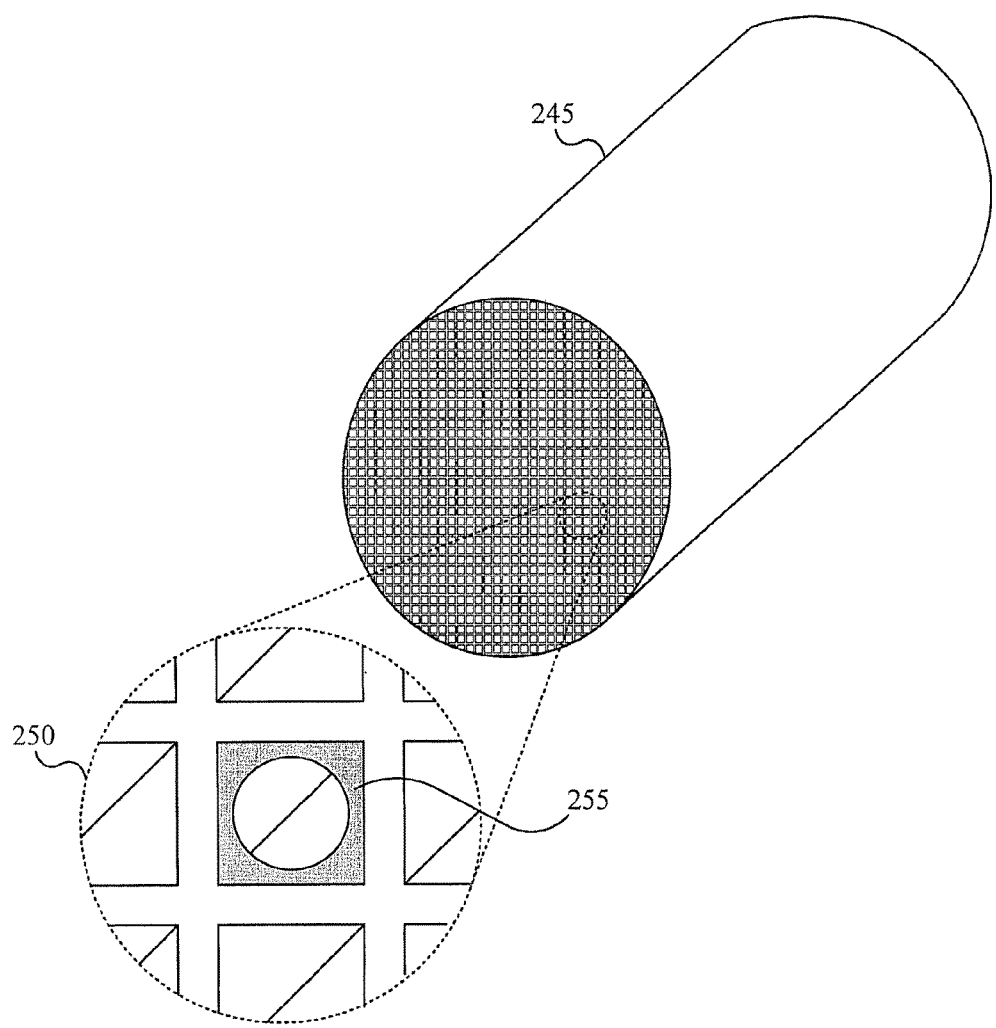
Figure 2C:
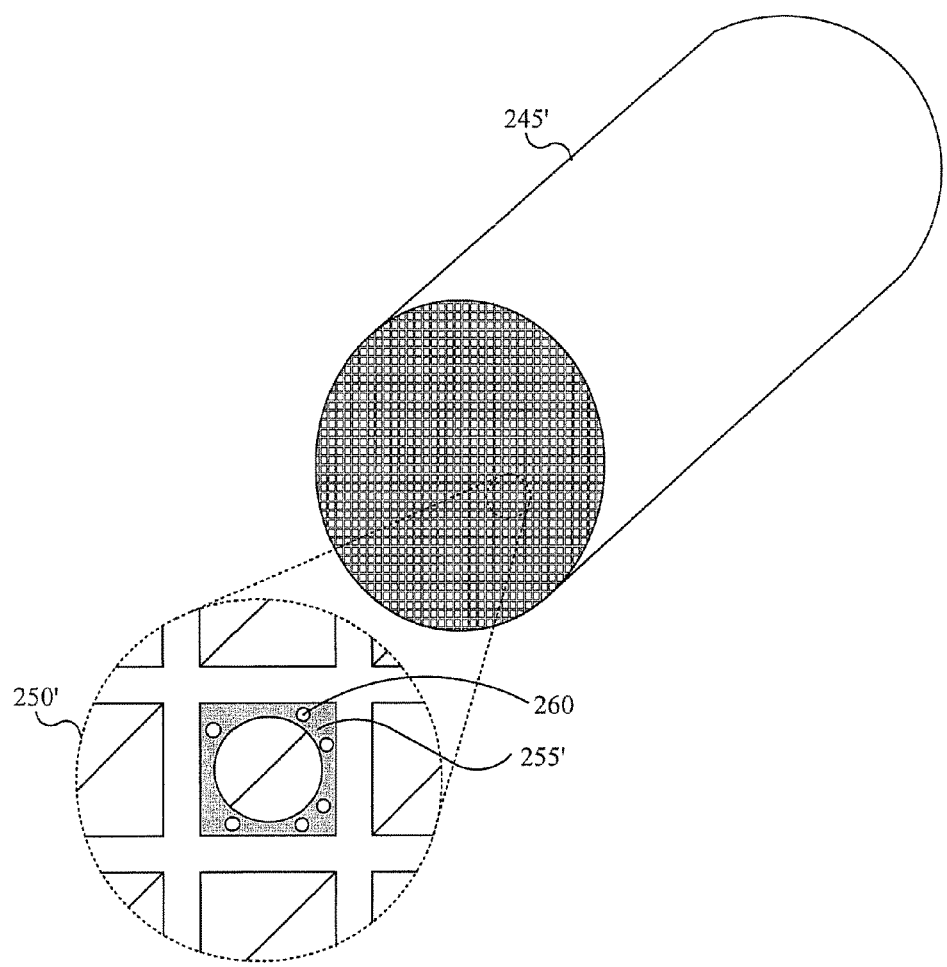
Figure 3A:
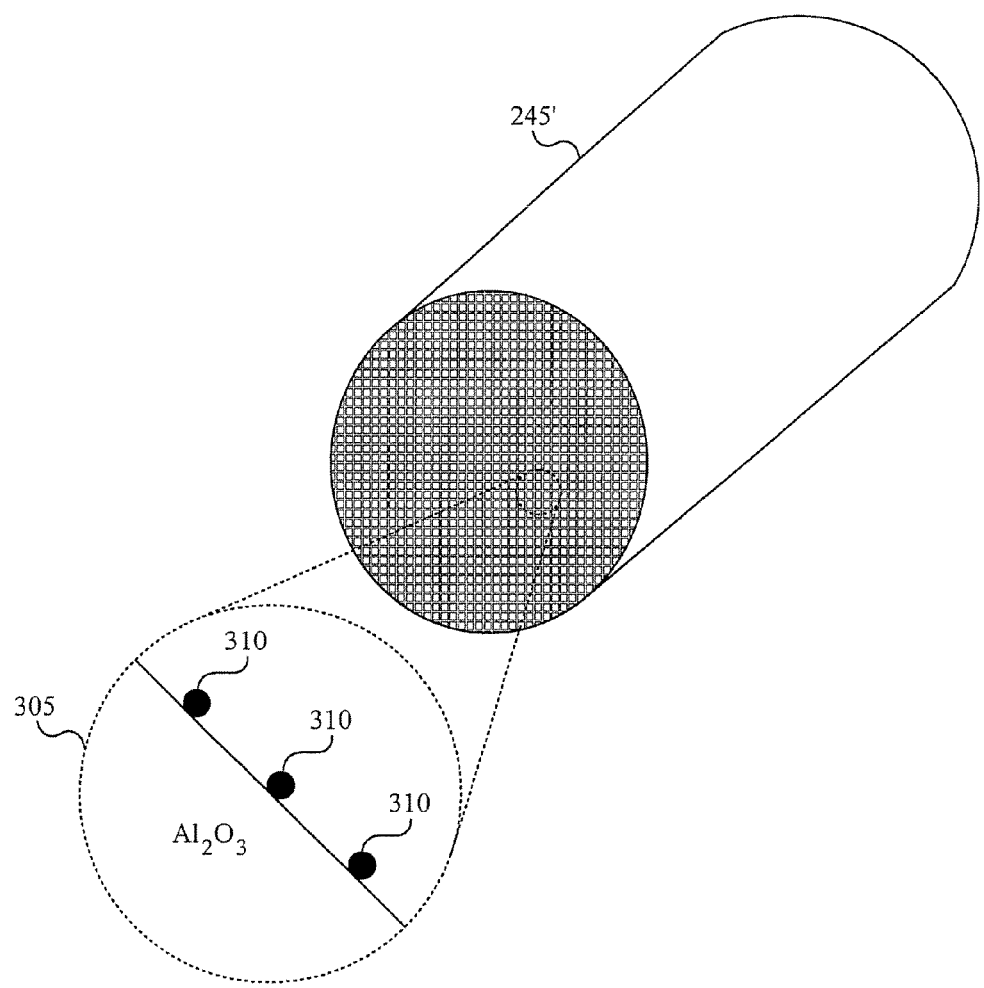
FIGS. 3A-3C illustrate activity on a surface of a layer of wash coat on the monolith using the first conventional method and the second conventional method.
Figure 3B:
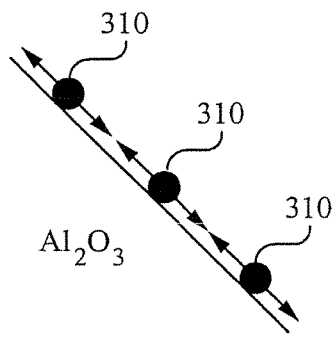
Figure 3C:
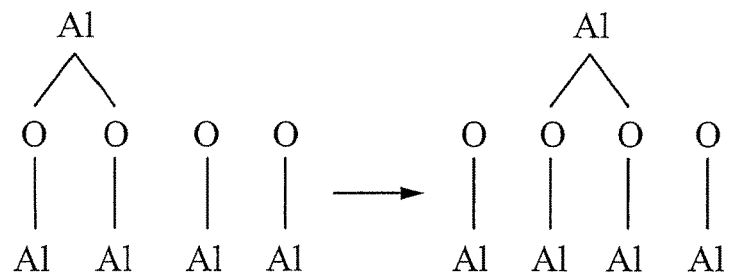
Figure 3D:
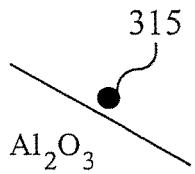
FIG. 3D illustrates platinum atoms coalesced into a large particle.
Figure 4:
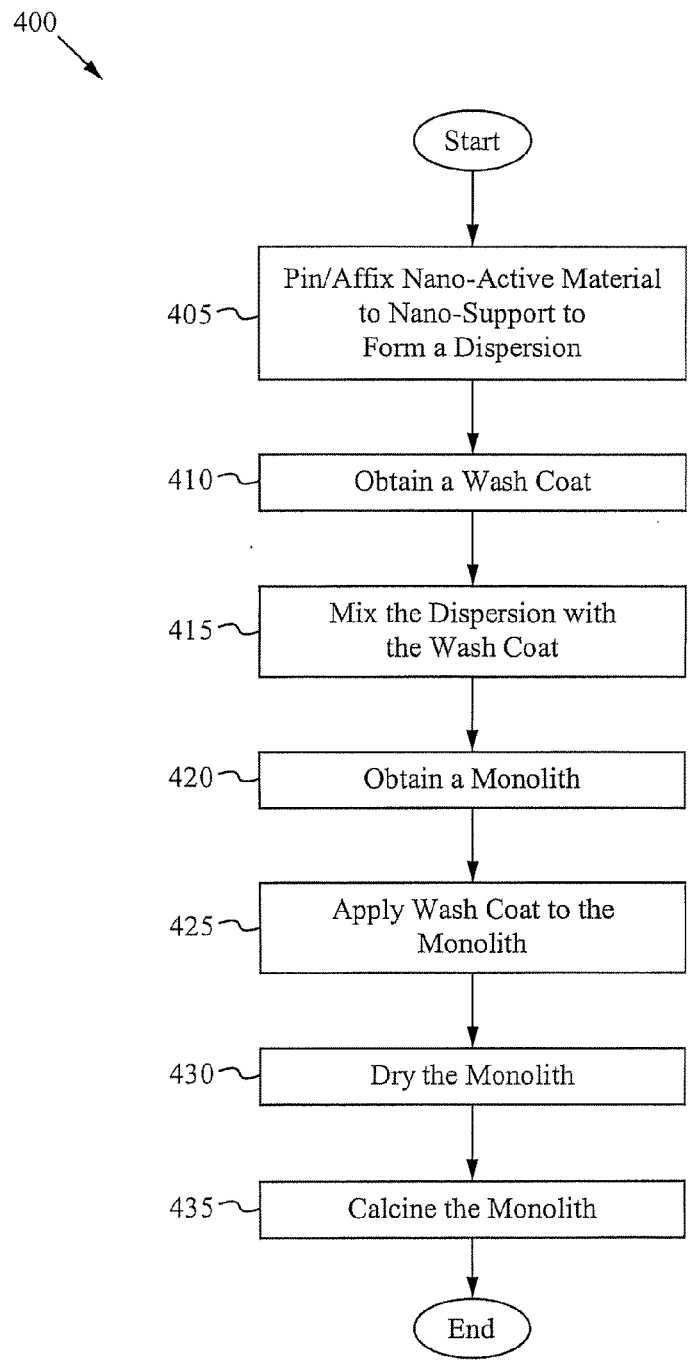
FIG. 4 illustrates a first inventive process of creating an advanced catalyst in accordance with the present invention.
Figure 5:
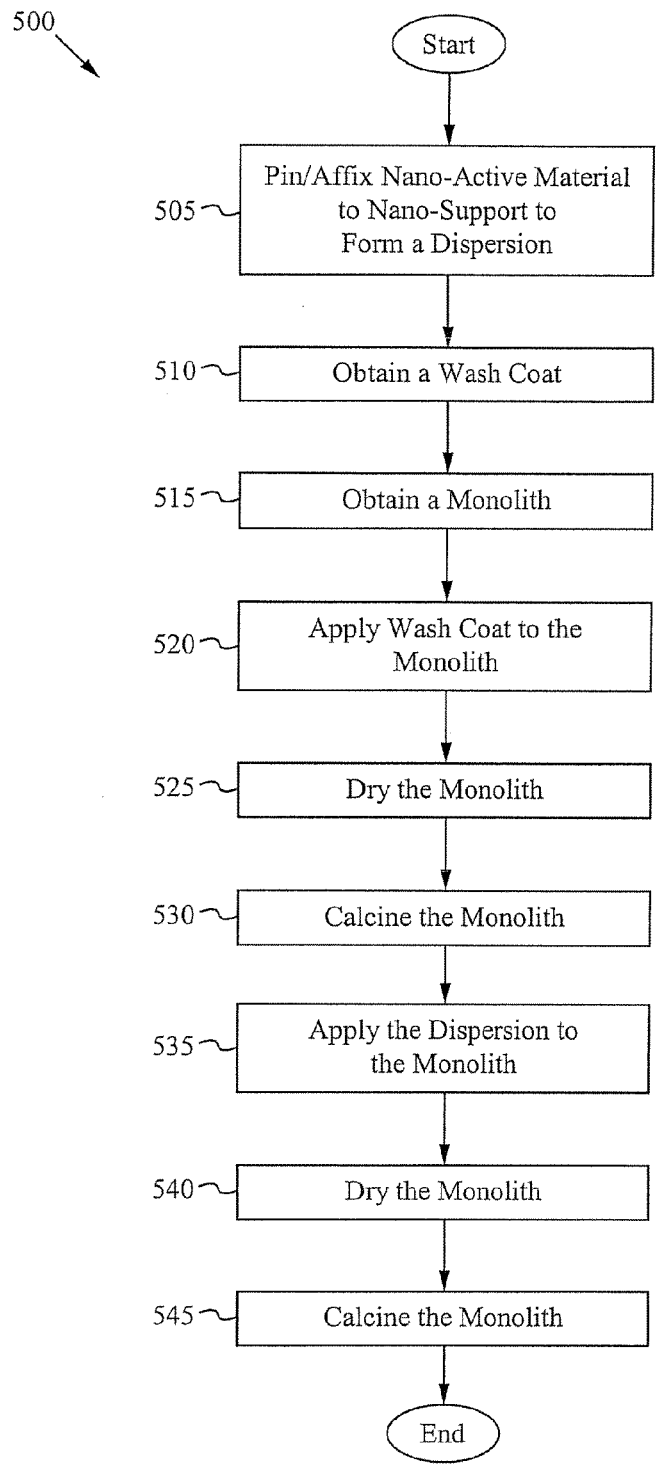
FIG. 5 illustrates a first inventive process of creating an advanced catalyst in accordance with the present invention.

A diesel engine includes a diesel oxidation catalyst (DOC), a separate NOx reduction technology, and a diesel particulate filter (DPF). The DOC is a two-way catalytic converter, which converts (1) CO and $O_2$ to $CO_2$ and (2) $H_aC_b$ and $O_2$ to $CO_2$ and $H_2O$. The DOC uses platinum as an oxidizing agent. Conventional methods of creating the DOC use micron-size platinum ions. Embodiments of the present invention use nano-sized platinum particles instead. FIGS. 4-5 illustrate two inventive processes of creating an advanced DOC catalyst in accordance with the present invention. The separate NOx reduction technology reduces the $NO_x$ emissions by using urea as a reducing agent. The DPF catches subparticles (e.g. nongaseous hydrocarbons) from an exhaust gas of the diesel engine.

FIG. 4 illustrates a first inventive process 400 for creating the advanced DOC catalyst in accordance with the present invention. At a step 405, nano-active materials are pinned or affixed to nano-supports, forming nano-particles, by using a high temperature condensation technology such as a plasma gun. In some embodiments, the nano-active materials are gaseous platinum atoms, and the nano-supports are some form of alumina, such as aluminum plus oxygen. For the sake of brevity, platinum will be discussed herein, but it will be apparent to those of ordinary skill in the art that different platinum group metals can be used to take advantage of their different properties. Since nano-active materials are strongly attached to nano-supports, movement or coalescing/conglomeration of the nano-active materials is limited, prevented, or both. The nano-particles are then combined with a liquid to form a dispersion. The nano-particles and the dispersion are created using methods described in detail in U.S. patent application Ser. No. 12/001,643, filed Dec. 11, 2007, which is hereby incorporated by reference. At a step 410, a wash coat is obtained. The wash coat is commercially purchased or is made. Typically, the wash coat is a slurry. The wash coat is made by using micron-sized oxides that include alumina and silica. In some embodiments, a certain amount of stabilizers for the alumina and a certain amount of promoters are also added to the wash coat. Typically, there is no difference between the commercially purchased wash coat and the created wash coat. At a step 415, the dispersion is mixed with the wash coat. At a step 420, a cylindrical-shaped ceramic monolith is obtained. The monolith contains a large proportion of cordierite since cordierite has a high resistance to thermal shock. In some embodiments, the monolith is a honeycomb structure. A cross-section of the monolith preferably contains 300-600 channels per square inch. The channels are preferably linear square channels that run from the front to the back of the monolith. At a step 425, the monolith is coated with a layer of the wash coat. This can be achieved by dipping the monolith in the wash coat. The channels of the monolith are also coated with a layer of wash coat. Since the wash coat contains the nano-particles, nano-platinum particles are also on the surface of the monolith. At a step 430, the monolith is dried. At a step 435, the monolith is calcined. The calcination bonds the components of the wash coat to the monolith by oxide to oxide coupling. In addition, the calcination allows the nano-active materials to strongly attach to the nano-supports because the nano-supports have a partially reduced alumina surface. As such, the advanced DOC catalyst is formed.

FIG. 5 illustrates a second inventive process 500 for creating the advanced DOC catalyst in accordance with the present invention. At a step 505, nano-active materials are pinned or affixed to nano-supports, forming nano-materials, by using a high temperature condensation technology such as a plasma gun. In some embodiments, the nano-active materials are gaseous platinum atoms and the nano-supports are some form of alumina, such as aluminum plus oxygen. Since nano-active materials are strongly attached to nano-supports, movement or coalescing/conglomeration of the nano-active materials is limited, prevented, or both. The nano-particles are then combined with a liquid to form a dispersion. At a step 510, a wash coat is obtained. The wash coat is commercially purchased or is made. The wash coat is made by using micron-sized oxides that include alumina and silica. In some embodiments, a certain amount of stabilizers for the alumina and a certain amount of promoters are also added to the wash coat. Typically, there is no difference between the commercially purchased wash coat and the created wash coat. At a step 515, a cylindrical-shaped ceramic monolith is obtained. At a step 520, the monolith is coated with a layer of the wash coat such as via dipping. As such, the channels of the monolith are also coated with a layer of the wash coat. At a step 525, the monolith is dried. At a step 530, the monolith is calcined. At a step 535, the dispersion is applied to the monolith via dipping. At a step 540, the monolith is dried. At a step 545, the monolith is calcined. The calcination bonds the components of the wash coat to the monolith by oxide to oxide coupling. As such, the advanced DOC catalyst is formed In order for the wash coat to get good bonding to the monolith, both pH level and viscosity of the wash coat must be in a certain range. Typically, the pH level must be between four and five to achieve oxide-oxide coupling. If the pH level is too low, then the viscosity is too high; as such, the wash coat is a paste instead of a slurry. If the pH level is too high, then the viscosity is too low; as such, even after calcination, the wash coat does not bond to the monolith. Although the use of nanomaterials applied to the advanced DOC catalyst is described, the use of nanomaterials is able to be applied to the DPF and the NOx reduction technology used in the diesel engine. Other catalysts in the automation space are also contemplated.

Gas Engines

A gas engine cycles from oxygen rich to oxygen poor (e.g., an oxidizing state to a reducing state). As such, a conventional catalytic converter for gas engines includes an oxidation catalyst and a reduction catalyst. The reduction catalyst is a first stage in the conventional catalytic converter. The reduction catalyst uses platinum and rhodium to help reduce NOx emissions. For example, rhodium catalyzes CO and $NO_2$ to $N_2$ and $CO_2$. The oxidation catalyst is a second stage in the conventional catalytic converter. It reduces unburned hydrocarbons and carbon monoxide by oxidizing them using platinum and palladium. For example, platinum catalyzes CO and $O_2$ to $CO_2$ and catalyzes $H_aC_b$ and $O_2$ to $CO_2$ and $H_2O$. Palladium catalyzes $H_aC_b$ and $O_2$ to $CO_2$ and $H_2O$. The oxidation catalyst aids reaction of the carbon monoxide and hydrocarbons with the remaining oxygen in the exhaust pipe. Accordingly, the gas engine uses a three-way catalytic converter to reduce the three harmful compounds.

Conventional methods of creating the three-way catalytic converter use micron-sized catalytic materials and supports, as discussed above. In addition, the conventional methods use multiple dippings to get palladium ions, rhodium ions, and platinum ions on the monolith since a dip that includes, for example, palladium ions and rhodium ions would produce palladium-rhodium alloys, which is not beneficial in certain conditions and/or applications. Embodiments of the present invention use nano-sized catalytic materials and supports instead. In additions, embodiments of the present invention allows a dip to include palladium ions, rhodium ions, and platinum ions without creating palladium-rhodium alloys, because the different ions have different solid phases.

Methods of creating the advanced three-way catalyst for gas engines are similar to the methods of creating the DOC as discussed above. The difference is in the initial steps 405 and 505 of FIGS. 4-5, respectively. Specifically, instead of using just gaseous platinum atoms in the dispersion, gaseous palladium atoms and gaseous rhodium atoms are also used.

FIG. 6A illustrates a first method of creating the dispersion in accordance with the present invention. Catalyst materials include platinum 615, palladium 620, and rhodium 625. Other catalyst materials are contemplated. Carrier material includes alumina 630. The catalyst materials 615, 620, 625 and carrier material 630 are mixed in a plasma gun. After vaporizing the catalyst materials and carrier material to form a vapor cloud and quenching the vapor cloud, the vapor cloud precipitates nano-particles. FIG. 6B illustrates a nano-particle 600 in accordance with the present invention. The nano-particle 600 comprises a nano-active material 610 and a nano-support 605. Since the plasma gun is extremely chaotic, the catalyst materials form into an alloy. As such, the nano-active material 610 is an alloy. Since a ratio of the nano-active material 610 consisting of platinum, palladium, and rhodium, depends on an initial ratio of each of the catalyst materials used, different forms of alloys are formed on the nano-support 605. The nano-particles 600 are combined with the liquid to form the dispersion.

FIG. 7A illustrates a second method of creating the dispersion in accordance with the present invention. Instead of mixing platinum 615, palladium 620, rhodium 625, and alumina 630 in the plasma gun, each of the catalyst materials are separately mixed with alumina 630 in the plasma gun. As such, after vaporizing and quenching each of the catalyst materials, three different nano-particles are formed. A collection of the different nano-particles are combined with the liquid to form the dispersion. The three different nano-particles are illustrated in FIG. 7B. A first nano-particle 600' is a platinum nano-active material 635 on the alumina nano-support 605. A second nano-particle 600'' is a palladium nano-active material 640 on the alumina nano-support 605. A third nano-particle 600''' is a rhodium nano-active material 645 on the alumina nano-support 605. A size of the nano-active material is able to be controlled based on a quantity of the nano-active material that was initially placed in the plasma gun. Concentration of each different nano-particle 600', 600'', 600''' is able to be individually and/or collectively controlled.

After creating a dispersion either using the first method (as illustrated in FIG. 6A) or the second method (as illustrated in FIG. 7A), the first inventive process 400 continues at a step 410 and the second inventive process 500 continues at a step 510, as illustrated in FIGS. 4-5, respectively.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A method of making a catalytic converter comprising:
   loading feed material into a plasma reactor, the feed material comprising active material and a support material;
   vaporizing the active material and the support material in the plasma reactor thereby forming a vapor cloud of active material and support material;
   condensing the vapor cloud of active material and support material, thereby forming solidified nanoparticles comprising nano-active material and nano-support material; and
   applying a wash coat comprising the solidified nanoparticles comprising nano-active material and nano-support material to a substrate to produce a catalytic converter.

2. The method of claim 1, wherein the nano-active material comprises platinum.

3. The method of claim 1, wherein the nano-active material comprises palladium.

4. The method of claim 1, wherein the nano-active material comprises rhodium.

5. The method of claim 1, wherein the nano-active material is an alloy.

6. The method of claim 1, wherein the nano-support comprises alumina.

7. The method of claim 1, wherein the nano-support comprises a partially reduced alumina surface, the partially reduced alumina surface configured to limit movement of the nano-active material on a surface of the nano-support.

8. The method of claim 1, wherein the feed material comprises a plurality of different active materials.

9. The method of claim 8, wherein the support material comprises alumina.

10. The method of claim 8, wherein the different active materials include platinum, palladium, and rhodium.

11. The method of claim 1, wherein the wash coat comprises micron sized oxide particles.

12. The method of claim 1, wherein the wash coat comprises micron sized alumina particles.

13. A method of making a catalytic converter comprising
loading a first feed material into a plasma reactor, the first feed material comprising first active material and a first support material;
vaporizing the first active material and the first support material in the plasma reactor thereby forming a vapor cloud of first active material and first support material;
condensing the vapor cloud of first active material and first support material, thereby forming solidified first nanoparticles comprising first nano-active material and first nano-support material;
loading a second feed material into a plasma reactor, the second feed material comprising second active material and a second support material;
vaporizing the second active material and the second support material in the plasma reactor thereby forming a vapor cloud of second active material and second support material;
condensing the vapor cloud of second active material and second support material, thereby forming solidified second nanoparticles comprising second nano-active material and second nano-support material; and
applying the first nanoparticles comprising first nano-active material and first nano-support material and the second nanoparticles comprising second nano-active material and second nano-support material to a substrate to produce a catalytic converter.

14. The method of claim 13, further comprising:
loading a third feed material into a plasma reactor, the third feed material comprising third active material and a third support material;
vaporizing the third active material and the third support material in the plasma reactor thereby forming a vapor cloud of third active material and third support material;
condensing the vapor cloud of third active material and third support material, thereby forming solidified third nanoparticles comprising third nano-active material and third nano-support material; and
applying the third nanoparticles comprising third nano-active material and third nano-support material to the substrate.

15. The method of claim 14, wherein at least one of the first support material, the second support material, and the third support material comprises alumina.

16. The method of claim 14, wherein the third active material comprises rhodium.

17. The method of claim 14, wherein the first active material comprises platinum, the second active material comprises palladium, and the third active material comprises rhodium.

18. The method of claim 13, wherein the first active material comprises platinum.

19. The method of claim 13, wherein the second active material comprises palladium.

20. A method of making a three-way catalytic converter comprising:
loading a first feed material into a plasma reactor, the first feed material comprising an oxidation active material and a first support material;
vaporizing the first oxidation active material and the first support material in the plasma reactor thereby forming a vapor cloud of oxidation active material and first support material;
condensing the vapor cloud of oxidation material and first support material, thereby forming solidified oxidation nanoparticles comprising oxidation nano-active material and first nano-support material;
loading a second feed material into a plasma reactor, the second feed material comprising reduction active material and a second support material;
vaporizing the reduction active material and the second support material in the plasma reactor thereby forming a vapor cloud of reduction active material and second support material;
condensing the vapor cloud of reduction active material and second support material, thereby forming solidified reduction nanoparticles comprising reduction nano-active material and second nano-support material; and
applying the oxidation nanoparticles comprising oxidation nano-active material and first nano-support material, and the reduction nanoparticles comprising reduction nano-active material and second nano-support material to a substrate.

21. The method of claim 20, wherein the oxidation active material comprises platinum.

22. The method of claim 20, wherein the oxidation active material comprises palladium.

23. The method of claim 20, wherein the reduction active material comprises rhodium.

24. The method of claim 20, wherein the oxidation active material is an alloy.

25. The method of claim 20, wherein the first support comprises alumina.

26. The method of claim 20, wherein the first support material comprises a partially reduced alumina surface, the partially reduced alumina surface configured to limit movement of the nano-active material on a surface of the nano-support.

27. The method of claim 20, further comprising:
loading a third feed material into a plasma reactor, the third feed material comprising second oxidation active material and a third support material;
vaporizing the second oxidation active material and the third support material in the plasma reactor thereby forming a vapor cloud of second oxidation active material and third support material;
condensing the vapor cloud of second oxidation active material and third support material, thereby forming solidified second oxidation nanoparticles comprising second oxidation nano-active material and third nano-support material; and
applying the second oxidation nanoparticles comprising second oxidation nano-active material and third nano-support material to the substrate.

28. The method of claim 27, wherein the oxidation active material comprises platinum, the second oxidation active material comprises palladium, and the reductive active material comprises rhodium.

29. A method of making a two-way catalytic converter comprising:
loading a feed material into a plasma reactor, the first feed material comprising a first oxidation active material and a first support material;

vaporizing the first oxidation active material and the first support material in the plasma reactor thereby forming a vapor cloud of first oxidation active material and first support material;

condensing the vapor cloud of first oxidation material and first support material, thereby forming solidified oxidation nanoparticles comprising first oxidation nano-active material and first nano-support material; and applying the oxidation nanoparticles comprising first oxidation nano-active material and first nano-support material to a substrate.

30. The method of claim 29, wherein the first oxidation active material comprises platinum.

31. The method of claim 29, wherein the first nano-support material comprises alumina.

32. The method of claim 29, wherein the first nano-support material comprises a partially reduced alumina surface, the partially reduced alumina surface configured to limit movement of the first nano-active material on a surface of the first nano-support material.

33. The method of claim 29, wherein the first oxidation active material comprises palladium.

34. The method of claim 29, wherein the first oxidation active material is an alloy.

\* \* \* \* \*